United States Patent
Ummadi et al.

(10) Patent No.: US 10,922,012 B1
(45) Date of Patent: Feb. 16, 2021

(54) FAIR DATA SCRUBBING IN A DATA STORAGE SYSTEM

(71) Applicant: Dropbox, Inc., San Francisco, CA (US)

(72) Inventors: Sandeep Kumar R. Ummadi, Issaquah, WA (US); Omar Jaber, Issaquah, WA (US)

(73) Assignee: Dropbox, Inc., San Francisco, CA (US)

( * ) Notice: Subject to any disclaimer, the term of this patent is extended or adjusted under 35 U.S.C. 154(b) by 59 days.

(21) Appl. No.: 16/558,954

(22) Filed: Sep. 3, 2019

(51) Int. Cl.
*G06F 3/06* (2006.01)

(52) U.S. Cl.
CPC .......... *G06F 3/0652* (2013.01); *G06F 3/0604* (2013.01); *G06F 3/0673* (2013.01)

(58) Field of Classification Search
CPC .... G06F 3/0652; G06F 3/0604; G06F 3/0673; G06F 11/10
See application file for complete search history.

(56) References Cited

U.S. PATENT DOCUMENTS

| | | | |
|---|---|---|---|
| 8,301,600 B1 | 10/2012 | Helmick et al. | |
| 8,521,685 B1 | 8/2013 | Chatterjee | |
| 10,007,456 B1* | 6/2018 | Chinnakkonda Vidyapoornachary et al. | G06F 11/106 |
| 2005/0028048 A1* | 2/2005 | New | G06F 11/1076 714/54 |
| 2005/0073884 A1* | 4/2005 | Gonzalez | G06F 11/106 365/185.02 |
| 2005/0273551 A1 | 12/2005 | Keays | |
| 2006/0184722 A1 | 8/2006 | Sinclair | |
| 2007/0011660 A1 | 1/2007 | Garyali | |
| 2008/0235560 A1 | 9/2008 | Colmer | |
| 2008/0244743 A1 | 10/2008 | Largman | |
| 2009/0070648 A1* | 3/2009 | Allison | G06F 11/106 714/746 |
| 2009/0168525 A1 | 7/2009 | Olbrich et al. | |
| 2009/0172262 A1 | 7/2009 | Olbrich | |
| 2010/0223423 A1 | 9/2010 | Sinclair et al. | |
| 2010/0250632 A1 | 9/2010 | Uno et al. | |
| 2011/0055170 A1 | 3/2011 | Mark | |
| 2011/0072199 A1 | 3/2011 | Reiter et al. | |
| 2011/0099351 A1 | 4/2011 | Condict | |
| 2011/0276744 A1 | 11/2011 | Sengupta | |
| 2011/0320709 A1* | 12/2011 | Han | G06F 3/0617 711/114 |
| 2012/0060072 A1 | 3/2012 | Simitci | |
| 2013/0128666 A1* | 5/2013 | Avila | G11C 16/3418 365/185.11 |

(Continued)

OTHER PUBLICATIONS

Rabin, "Efficient Dispersal of Information for Sevurity, Load Balancing, and Fauly Tolerance", dated 1989, pp. 33-348.

(Continued)

*Primary Examiner* — Ryan Bertram
(74) *Attorney, Agent, or Firm* — Hickman Becker Bingham Ledesma LLP; Adam C. Stone

(57) ABSTRACT

Computer-implemented techniques for fair data scrubbing. The techniques can be used to balance a desire to verify recently stored data soon after it is stored on a target data storage media device, when the computing and networking cost of reconstructing the data in the event of a detected data storage media device error can be lower, against a desire to minimize the latency between rescrubbing data. By doing so, the techniques improve the operation of a data storage system that implements the techniques.

20 Claims, 14 Drawing Sheets

(56) References Cited

U.S. PATENT DOCUMENTS

| | | | |
|---|---|---|---|
| 2013/0173536 A1 | 7/2013 | Gokhale | |
| 2013/0282955 A1 | 10/2013 | Parker | |
| 2013/0290648 A1 | 10/2013 | Shao et al. | |
| 2014/0115239 A1 | 4/2014 | Kong | |
| 2014/0164319 A1 | 6/2014 | Smarr | |
| 2015/0186270 A1 | 7/2015 | Peng | |
| 2015/0212736 A1 | 7/2015 | Fenske et al. | |
| 2016/0062694 A1 | 3/2016 | Makkar | |
| 2016/0117223 A1* | 4/2016 | Mnich | G06F 11/106 714/764 |
| 2017/0031753 A1* | 2/2017 | Chinnakkonda Vidyapoornachary | G06F 3/0679 |
| 2017/0308313 A1* | 10/2017 | Chinnakkonda Vidyapoornachary et al. | G06F 3/0631 |
| 2018/0137004 A1* | 5/2018 | Gao | G06F 11/073 |
| 2019/0227732 A1* | 7/2019 | Jung | G06F 11/106 |
| 2020/0387323 A1* | 12/2020 | Boehm | G06F 3/0616 |

OTHER PUBLICATIONS

Interview Summary for U.S. Appl. No. 14/497,200 dated Apr. 12, 2017, 5 pages.

Office Action for U.S. Appl. No. 14/497,200 dated Oct. 14, 2016, 15 pages.

U.S. Appl. No. 14/540,610, filed Nov. 13, 2014, Office Action, dated Aug. 16, 2016.

U.S. Appl. No. 14/497,212, filed Sep. 25, 2014, Office Action, dated Sep. 22, 2016.

U.S. Appl. No. 14/497,195, filed Sep. 25, 2014, Office Action, dated Jun. 30, 2016.

U.S. Appl. No. 14/497,195, filed Sep. 25, 2014, Final Office Action, dated Dec. 31, 2016.

Crowling, U.S. Appl. No. 14/497,195, filed Sep. 25, 2014, Notice of Allowance, dated Mar. 23, 2017.

Cowling, U.S. Appl. No. 14/497,212, filed Sep. 25, 2014, Notice of Allowance, dated Feb. 23, 2017.

Cowling, U.S. Appl. No. 14/497,195, filed Sep. 25, 2014, Interview Summary, dated Jan. 27, 2017.

Cowling, U.S. Appl. No. 14/497,195, filed Sep. 25, 2014, Advisory Action, dated Mar. 9, 2017.

* cited by examiner

FAIR DATA SCRUBBING IN A DATA STORAGE SYSTEM

CROSS-REFERENCE TO RELATED APPLICATIONS

This application is related to the following applications: U.S. patent application Ser. No. 14/497,195, now U.S. Pat. No. 9,720,607, filed Sep. 25, 2014, and entitled "Append-Only Storage System Supporting Open and Closed Extents."

U.S. patent application Ser. No. 14/497,212, now U.S. Pat. No. 9,690,823, filed Sep. 25, 2014, and entitled "Synchronizing Copies of an Extent in an Append-Only Storage System."

U.S. patent application Ser. No. 14/540,610, now U.S. Pat. No. 9,619,322, filed Nov. 13, 2014, and entitled "Erasure-Coding Extents in an Append-Only Storage System."

FIELD OF THE INVENTION

The present disclosure relates in some embodiments to data scrubbing. In particular, the present disclosure relates to fair data scrubbing in a data storage system.

BACKGROUND

Large-scale online services are storing ever increasing amounts of data. As just one example, a large-scale centrally hosted network file system might store multiple exabytes of data on hard disks housed in data centers around the world. Critical to the successful operation of a large-scale online service is ensuring the safety of the data stored. Part of ensuring data safety is maintaining an extremely high level of durability of the data.

A common technique for maintaining a high-level of durability of data is replication. Hard disks can err. Data replication is often used to store multiple copies of data on physically isolated hard disks to prevent a hard disk error from causing the data to no longer be durable. One commonly used data replication technique is known as Reed-Solomon erasure coding. A variant of Reed-Solomon erasure coding that can provide lower storage overhead and lower network demands is described in related U.S. patent application Ser. No. 14/540,610, now U.S. Pat. No. 9,619,322, filed Nov. 13, 2014, and entitled "Erasure-Coding Extents in an Append-Only Storage System," the entire contents of which is hereby incorporated by reference as if fully set forth herein.

However, while replication may be necessary to ensure the safety of data, it may not be sufficient. For example, replication can ensure with a high probability that data is durable, but may not ensure that the data is correct. For example, hard disks can have bad sectors, silent disk corruption, bit flips, and drive controller, firmware, or software errors (e.g., failures committing data from memory-based write caches to non-volatile storage buffers). Thus, to properly ensure safety of the data, not only may it need to be replicated, it may also need to be verified.

Verification can involve scanning data stored on hard disks for errors and reporting and/or fixing detected errors. One of the lowest levels of verification is disk scrubbing. Disk scrubbing may involve, for example, reading back every data bit from disk and validating it against checksums (e.g., Cyclic Redundancy Checks).

To minimize impact on other processes that access the hard disk, such as processes that support end-user facing operations, the disk scrubbing process may be allocated a capped disk bandwidth. As a result, disk scrubbing can be a relatively slow process. For example, disk scrubbing an entire multi-terabyte hard disk can take weeks. Thus, it can be important to prioritize the order in which data is disk scrubbed to minimize the window of vulnerability for the data.

During this window of vulnerability, errors can arise in the data because of hard disk failures. When an error is detected during disk scrubbing, the affected data can be re-replicated to restore the data without the error. However, this may not be possible for recently written data that has not yet been replicated. Even in a situation where the data is replicated, if the latency between disk rescrubbing data is too long, the risk of data loss that cannot be remedied by efficient re-replication increases.

Embodiments of the present invention address these and other issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
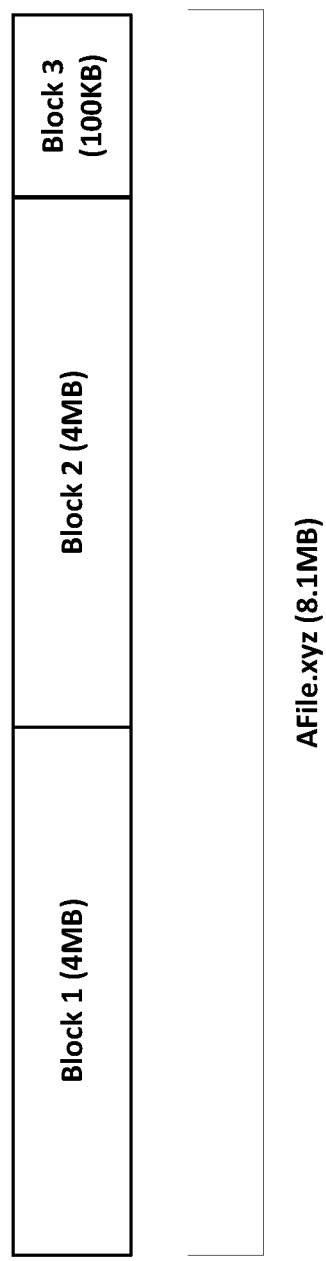
FIG. 1 illustrates content item blocks stored in a content item block storage system according to some possible implementations of the present invention.

In the following description, for the purposes of explanation, numerous specific details are set forth in order to provide a thorough understanding of embodiments of the present invention. It will be apparent, however, that embodiments of the present invention may be practiced without these specific details. In other instances, some structures, elements, steps, or devices may be shown in block diagram form in order to avoid unnecessarily obscuring embodiments of the present invention.

General Overview

As mentioned above, hard disks can err for various reasons. For example, a hard disk can have latent sector failures, disk sector corruptions, I/O errors, bit rot, controller errors, firmware errors, software bugs, etc. Disk scrubbing can be performed to detect hard disk errors. Disk scrubbing can involve validating cyclic redundancy checks (CRCs), on-disk metadata, checksums, or performing other data verification operations on data stored on a hard disk.

Computer-implemented techniques for fair data scrubbing in a data storage system are provided. The techniques can be used, for example, to balance a desire to verify recently stored data soon after it is stored on a data storage media device, when the computing and networking cost of reconstructing the data in the event of a detected data storage media device error can be lower, against a desire to minimize the latency between rescrubbing data. By doing so, the techniques improve the operation of the data storage system.

The data storage system may be composed of many data storage media devices. For example, the data storage system may be composed of hundreds or thousands of hard disks. In some possible implementations, the data storage system may include thousands of hard disks storing multiple exabytes of data or more. However, the techniques can be used in data storage system having fewer hard disks or storing less data. For example, it is possible to implement the techniques for a single data storage media device (e.g., a single hard disk).

It should be understood that while example embodiments and implementations are disclosed herein with respect to disk scrubbing hard disks, a hard disk is just one example of a type of data storage media device to which the techniques disclosed herein for fair data scrubbing may be applied. Other types of data storage media devices to which the disclosed techniques may be applied include, but are not limited to, volatile media devices and/or other types of non-volatile data storage media devices. Non-volatile data storage media devices include, for example, read-only memory devices (e.g., EEPROMs), flash memory devices (e.g., solid-state drives), memristor devices, etc. Volatile media devices include, for example, random-access memory devices, dynamic random-access memory devices (e.g., DRAMs), and static random-access memory devices (e.g., SRAMs).

As used herein, data scrubbing or just "scrubbing" may encompass, but is not limited to, disk scrubbing hard disks. More generally, data scrubbing or just "scrubbing" may encompass a process for verifying the correctness or integrity of data stored on a computer data storage media device whether the computer data storage media device is a hard disk or another type of computer data storage media device.

Data scrubbing can be performed in the background by allotting a data scrubbing process a fixed or varying limited data storage media device bandwidth (e.g., 10 megabytes per second) for data scrubbing. By doing so, impact on other processes that require data storage media device I/O is reduced. For example, these other processes may be involved in reading and/or writing data associated with a network request from a computing device of an end-user of an online service that operates a data storage system.

The techniques disclosed herein for fair data scrubbing can be implemented to determine, among other things, an order in which data stored on a data storage media device is data scrubbed where the order effectively balances the desires stated above. However, before providing an overview of the techniques disclosed herein, some other possible techniques are discussed.

According to a first possible technique termed herein "most recently stored first," the most recently stored data is always data scrubbed first. This approach can be useful in detecting immediate data storage media device errors when writing the data to a data storage media device such as those that might be caused by firmware or software errors or bugs. The approach may also be useful because the reconstruction cost of recently stored data can be cheaper in terms of computing (e.g., CPU) and network resources consumed.

For example, recently stored data can be temporarily replicated (e.g., copied) by creating semantic mirrors of the data in multiple physically isolated disks. These semantic mirrors can provide a high level of durability of the data but can be relatively inefficient in terms of how much data storage media device space is consumed by the semantic mirrors. Later, the semantic mirrors of the data can be erasure coded to more efficiently use a data storage media device space while at the same time still providing a high-level of durability.

As used herein in the context of mirroring data or data mirrors, the term "semantic mirrors" encompasses exact bit-for-bit copies of data but also encompasses "semantic copies" where the instances may be bit-for-bit different but nonetheless represent the same underlying information such that one semantic mirror can be substituted for another semantic mirror without loss of the underlying information. For example, as discussed in examples below, semantic mirrors called "extents" can represent the same set of content item blocks even though the content item blocks may be stored in different orders within the semantic mirrors. As another example, one semantic mirror representing certain underlying information may be unencrypted and another semantic mirror representing the same certain underlying information may be encrypted. The two are considered semantic mirrors of each other even though that may not be bit-for-bit identical because the unencrypted semantic mirror can be recovered by decrypting the encrypted semantic mirror and the encrypted semantic mirror can be recovered by encrypting the unencrypted semantic mirror.

If data scrubbing detects an error in a semantic mirror of data when the data is in its temporary semantic mirror state, then reconstructing the semantic mirror can be a relatively inexpensive operation such as, for example, copying another semantic mirror of the data from another data storage media device. However, once semantic mirrors are erasure coded, reconstructing the data, due to the nature of erasure coding, can be a relatively expensive operation in terms of processor (CPU) cycles consumed and network messages sent between nodes in the network involved in the reconstruction. Thus, it can be useful to data scrub recently stored data in its temporary semantic mirror state, before it is erasure-coded, to lower data reconstruction costs in the event the recently stored data needs to be reconstructed.

According to a second possible technique termed herein "least recently scrubbed first" that is an alternative to the most recently stored first technique, the least recently scrubbed data is always data scrubbed first. For given data stored on a data storage media device, the scrub latency of the data is the time since the data was last data scrubbed, if the data was previously data scrubbed, or the time since the data was first stored on the data storage media device, if the data has never been data scrubbed.

The least recently scrubbed data can then be identified as the data that currently has the longest scrub latency. The least recently scrubbed technique may be useful to maintain a maximum scrub latency guarantee close to a theoretical minimum for all data stored on a data storage media device. For example, for a ten (10) terabyte data storage media device that stores ten thousand (10,000) one (1) gigabyte data items, a data scrubbing process that implements this alternative possible implementation and scrubs data at ten (10) megabytes per second can provide a maximum scrub latency guarantee for each data item close a theoretical minimum of approximately eleven and one-half (11½) days (e.g., 10,000 data items multiplied by 1 gigabyte divided by 10 megabytes per second).

However, a data scrubbing process that uses only the most recently stored first technique can starve already scrubbed data of rescrubbing beyond a maximum tolerable scrub latency. On the other hand, if the data scrubbing process uses only the least recently scrubbed first technique, this can result in scrub latencies for recently stored data that extend beyond the time period when the recently stored data is in a temporary semantic mirrored replication state, resulting in potentially higher data reconstruction costs if and when data storage media device errors are detected in the data by the data scrubbing process after it has been erasure-coded.

Embodiments of the present invention address these and other issues.

According to some possible techniques of the present invention, data stored on a data storage media device that has already been scrubbed may be tracked separately from data stored on the data storage media device that has never been scrubbed.

Data stored on a data storage media device that has not been scrubbed since it was quiesced on a data storage media device may be referred to herein as "never-scrubbed" data. Never-scrubbed data stored on the data storage media device can be ordered by the time the data is quiesced on the data storage media device.

It should be noted that under certain circumstances data can be never-scrubbed data even if it the data has been previously scrubbed. For example, if the data is quiesced on a first data storage media device, then the data quiesced on the first data storage media device may be considered never-scrubbed data. Later, the data on the first data storage media device might be data scrubbed. After this data scrubbing, the data might be copied to a second data storage media device where it is quiesced on the second data storage media device. The data quiesced on the second data storage media device may be considered never-scrubbed data again. More examples of when data quiesced on a data storage media device is considered never-scrubbed are provided elsewhere herein.

Data quiesced on a data storage media device that has already been scrubbed at least once since it was quiesced on the data storage media device may be referred to herein as "already-scrubbed" data. Already-scrubbed data stored on the data storage media device can be ordered by the time it was last scrubbed. Already scrubbed data can become never scrubbed data if it is again quiesced on a data storage media device. More examples of when already scrubbed data becomes never scrubbed data are provided elsewhere herein.

According to some possible techniques of the present invention, data may be quiesced on a data storage media device after all of the data has been committed to non-volatile storage buffers of the data storage media device. According to some possible techniques of the present invention, data may be quiesced on a data storage media device after both: (A) all of the data has been committed to non-volatile storage buffers of the data storage media device, and (B) the data is in a read-only or in a closed state. These and other situations where data is considered quiesced on a data storage media device are described in greater elsewhere herein.

According to some possible techniques of the present invention, a data scrubbing process may data scrub already scrubbed data and never scrubbed data in an approximately equal ratio. For example, the data scrubbing process may alternate equally between scrubbing never scrubbed data and already scrubbed data stored on a data storage media device. However, if the amount of never scrubbed data stored on the data storage media device equals or exceeds a high-watermark threshold amount because of the rate at which data is being quiesced on the data storage media device relative to the scrubbing rate, then the data scrubbing process can scrub never scrubbed data more frequently than it scrubs already scrubbed data until the amount of never-scrubbed data quiesced on the data storage media device equals or falls below a low-watermark threshold amount. For example, instead of alternating between scrubbing never scrubbed data and already scrubbed data, the data scrubbing processes can data scrub never scrubbed data and already scrubbed at a higher ratio of never scrubbed data to already scrubbed data. When the amount of never scrubbed data quiesced on the data storage media device equals or falls below a low watermark threshold amount, the data scrubbing process can return to scrubbing already scrubbed data and never scrubbed data in an approximately equal ratio.

The techniques may be useful to prevent the scrub latencies of never scrubbed data exceeding the time between when the never scrubbed data is quiesced on a data storage media device and when the data is erasure coded. The techniques may also be useful to prevent starvation of rescrubbing already scrubbed data beyond a maximum allowable scrub latency.

These and other techniques of the present invention for fair data scrubbing in a data storage system will now be described with respect to the accompanying drawings. However, before describing the techniques for fair data scrubbing, some possible example environments in which the techniques can be used are described.

Data Storage Model

In some possible implementations, the techniques for fair data scrubbing in a data storage system may be implemented in a content item block storage system. However, the techniques may be implemented in other types of data storage systems including those that do not conform to the content item block storage system described in this section.

In some possible implementations, the content item block storage system is an immutable content item block storage system. That is, once a content item block is written to a data storage media device in the data storage system, it can be immutable with respect to the information contained in the content item block, even though the representation of the information in the content item block can change as a result of maintenance operations performed on the content item block such as, for example, erasure coding operations, data restoration operations, data compression operations, and/or data encryption operations.

FIG. 1 depicts content item blocks stored in a content item block storage system. Each content item block may be a chunk of a content item. A content item can be, for example, a file, a folder, a photo, image, text, audio, video, or other digital content. In the example of FIG. 1, data of an 8.1-megabyte size file named "AFile.xls" is divided across three content item blocks: Block 1, Block 2, and Block 3. However, no particular content item size is required by the content item block storage system, and a content item stored in the content item block storage system can be smaller or larger than 8.1 megabytes in size.

The content item block storage system can store many content item blocks for many content items. In some possible implementations, each content item block can store up to a predetermined amount of content item data. In the example of FIG. 1, a content item block stores up to four (4) megabytes of data of the file. However, no particular maximum content item block size is required by the content item block storage system, and the maximum content item block size can be smaller or larger than four (4) megabytes.

A content item block may contain less than the maximum amount of content item data depending on the size of the content item. For example, Block 1 and Block 2 each contain four (4) megabytes of content item data. But Block 3 only contains 100 kilobytes of content item data since that is the amount of content item data remaining after 8 megabytes of the content item are stored in Block 1 and Block 2. Thus, different content item blocks in the storage system can have different sizes.

While not required, the content item block storage system may use durable, inexpensive, storage dense, and low-latency spinning data storage media devices such as, for example, hard disks. For example, a hard disk in the content item block storage system may be based on conventional magnetic recording (CMR), perpendicular magnetic recording (PMR), shingled magnetic recording (SMR), or heat-assisted magnetic recording (HAMR) storage technology. In some possible implementations, a hard disk in the content item block storage system may have a ten (10) terabyte capacity. However, a hard disk in the content item block storage system can have less or greater data storage capacity. Further, different hard disks in the storage system can have different data storage capacities and may employ different magnetic storage technologies.

Before storing content item data in content item blocks on data storage media devices, the content item data may be compressed allowing the content item data to be stored in fewer content item blocks or to otherwise occupy less storage space of the data storage media devices. The content item data may also be encrypted for security and/or privacy. Thus, a content item block stored on data storage media devices in the content item block storage system may contain compressed and/or encrypted content item data.

Each content item block stored in the content item block storage system can be associated with a key, name, or identifier. In some possible implementations, a Secure-Hash-Algorithm two-hundred and fifty-six (256)-bit hash of contents of a content item block is used as the key, name, or identifier of the content item block. However, other probabilistically unique hash algorithms or identifiers can be used.

The content item block storage system can aggregate content item blocks into local storage containers referred to herein as "extents." In some possible implementations, an extent may have a predetermined maximum size. In some possible implementations, the predetermined maximum size of an extent may be one (1) gigabyte. However, the predetermined maximum size of an extent can be smaller or larger according to the requirements of the particular implementation at hand. Further, it is also possible for different extents to have different predetermined maximum sizes.

The content item blocks stored in an extent can have, but are not required to have, a logical relationship to one another. Thus, an extent may be viewed generally as containing an arbitrary set of content item blocks.

Extents can be replicated across multiple physically isolated data storage media devices for a high-level of durability. In some possible implementations, when new content item blocks are stored in the content item block storage system, they may be stored (replicated) on multiple physically isolated data storage media devices. Then, later, the extents containing the content item blocks may be aggregated together and erasure coded for storage efficiency. One or more extents replicated onto a set of physical isolated hard disks may be referred to herein as a "volume."

Figure 2:
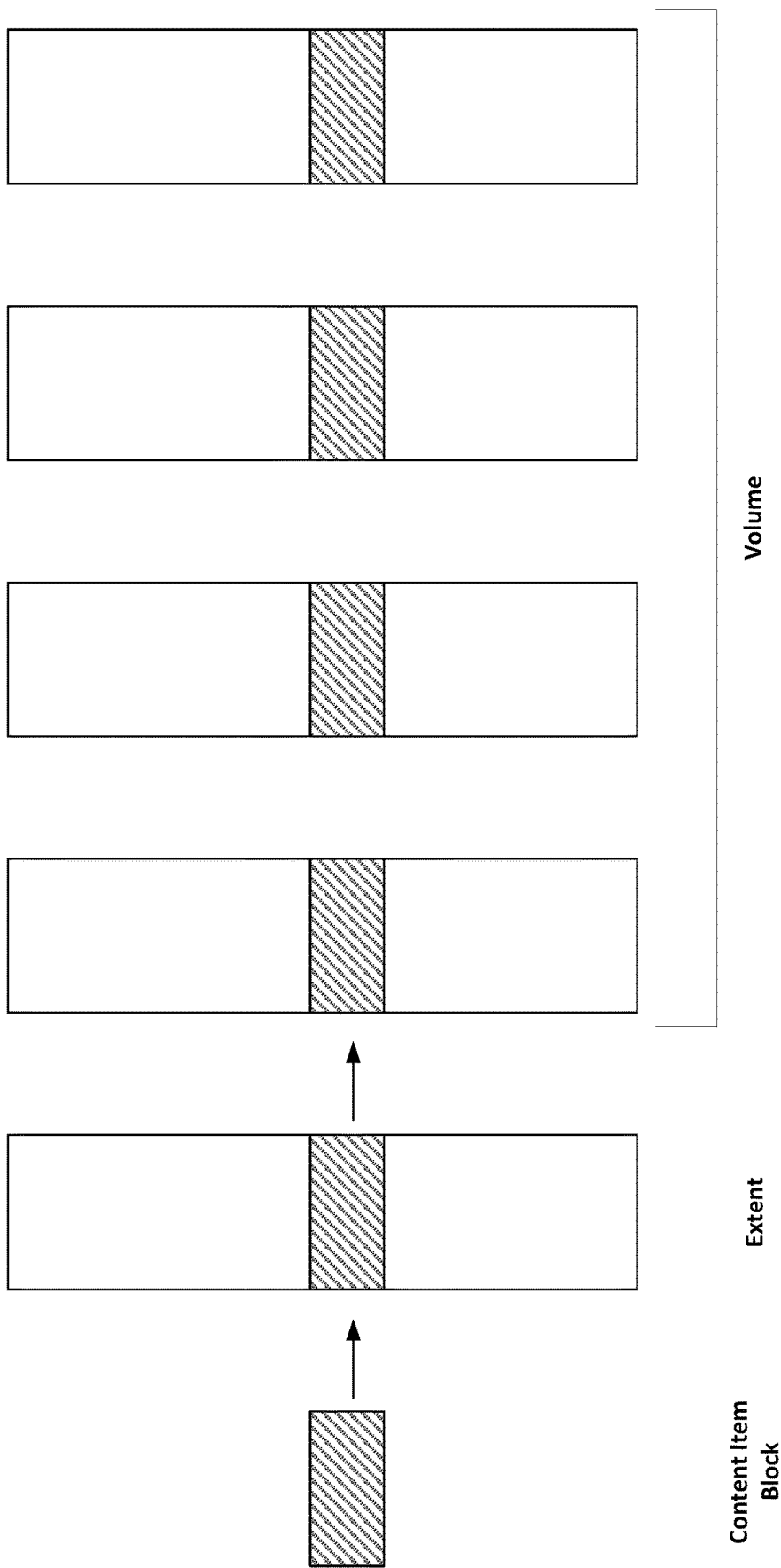
FIG. 2 depicts the relationship between content item blocks, extents, and volumes in a content item block storage system, according to some possible implementations of the present invention.

FIG. 2 illustrates the relationship between content item blocks, extents, and volumes in the content item block storage system, in accordance with some implementations. A content item block identified by its probablistically unique hash may be written to an extent. Each extent may be stored in a volume across multiple physically isolated hard disks, in either semantically mirrored or erasure coded form.

Content Management Environment

Figure 3:
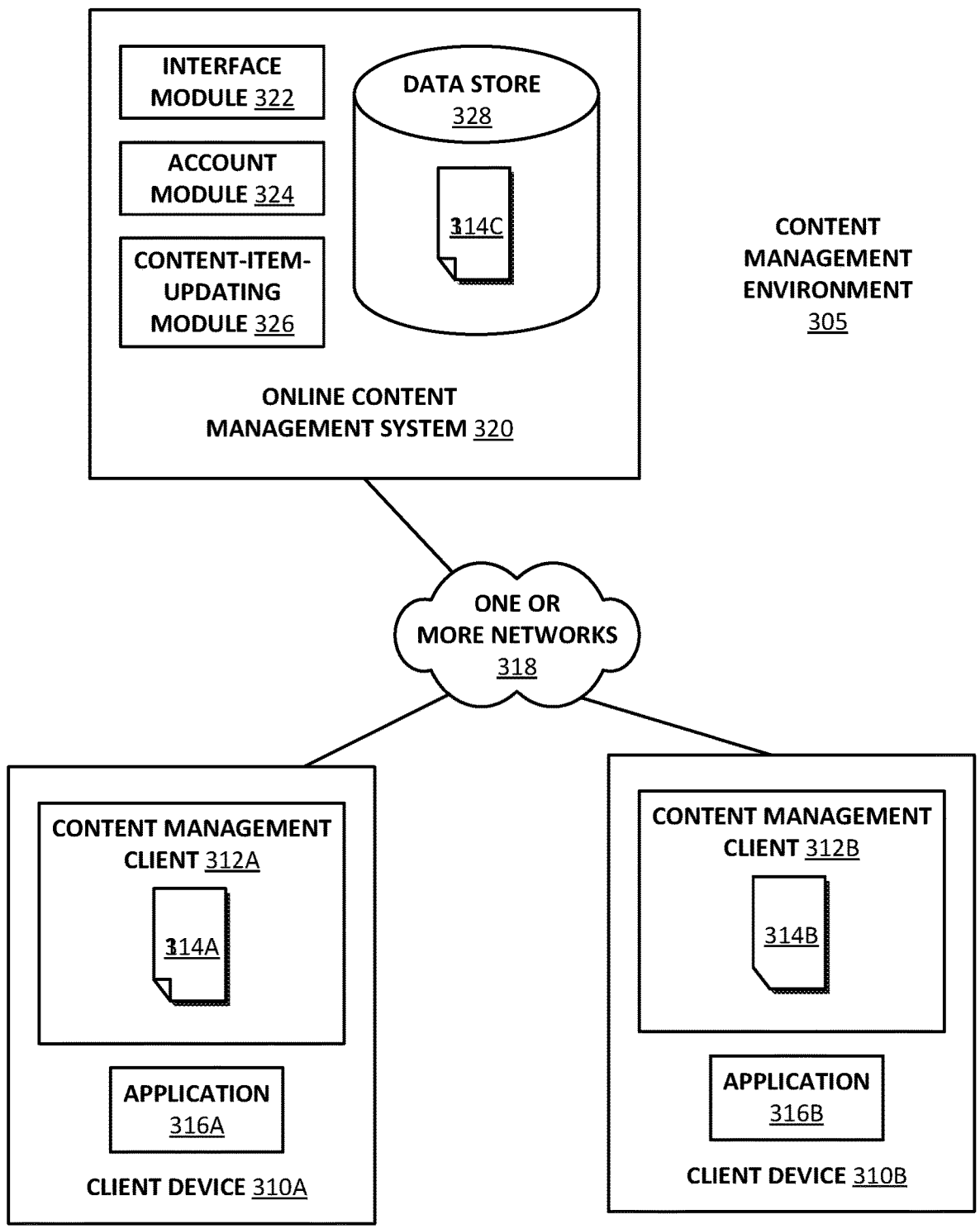
FIG. 3 illustrates an example content management environment in which the techniques disclosed herein for fair data scrubbing may be implemented, according to some possible implementations of the present invention.

FIG. 3 illustrates content management environment 305 in which the techniques disclosed herein for fair data scrubbing may be implemented, according to some possible implementations of the present invention. As may be understood from this figure, content-management environment 305 may include a plurality of client devices 310A and 310B (collectively 310) and a content management system 320 that may be interconnected by one or more networks 318. Various aspects of the client devices 310 and content management system 320 are discussed below.

In some possible implementations, each client device 310 may selectively execute a content management client application 312A and 312B (collectively 312) (also referred to as a "content management client") that may be used to access content items stored within content management system 320.

In some possible implementations, synchronized copies of a content item 314A, 314B and 314C may be maintained on client devices 310A and 310B and within content management system 320, respectively.

In some possible implementations, client devices 310 may provide a file-browser type interface (not shown) for directly manipulating the content items stored on content management system 320 without maintaining a local copy. Client devices 310 may also include applications 316A and 316B (collectively 316) that manipulate copies of content items 314A and 314B.

While only two client devices 310A and 310B are shown in FIG. 3 for purposes of clarity, it should be understood by those skilled in the art that many client devices 310 may simultaneously connect through network(s) 318 to content management system 320 at any given time. Examples of suitable client devices 310 include, but are not limited to, desktop computers; mobile computing devices, such as a laptop or a tablet; and handheld devices, such as a smartphone (e.g., an IPHONE® or ANDROID™-based smartphone).

Each client device 310 may store a local, synched copy of one or more content items from within content management system 320, and the content items may be stored in any suitable format.

When content management client 312 presents content items that are stored within the content management system 320 to a user, the content items may be arranged in folders and the folders themselves may be arranged in other folders, or in any other arbitrary arrangement supported by content management system 320, as determined by the user. However, one of skill in the art will understand in light of this disclosure that each user's content item storage architecture may be considerably different from the next, and in some instances, the content item storage architecture may be implemented to maximize storage and content item retrieval efficiency.

Content management system 320 may store content items and may manage access to those content items via client devices 310. Content management system 320 and its components may be implemented using any appropriate hardware and software that supports file serving, storage, and retrieval functions. For example, content management system 320 may be implemented in a single server or multiple servers.

In some possible implementations, content management system 320 may include interface module 322, account module 324, content item updating module 326, and data storage system 328. Some of the elements of content management system 320 are discussed below.

In some possible implementations, interface module 322 may facilitate content item access and content item storage operations among content management system 320 and client devices 310. Interface module 322 may receive content items from and send content items to client devices 310 consistent with the user's preferences for sharing content items. Interface module 322 may also act as the counterpart to a client-side file explorer-style user interface that allows a user to manipulate content items directly stored on content-management system 320.

In some possible implementations, software on client devices 310 may integrate network-stored content items with the client's local file system to enable a user to manipulate network-stored content items through the same user interface (UI) used to manipulate content items on the local file system, e.g., via a file explorer, file finder or browser application.

As an alternative or a supplement to the client-side file-explorer interface, interface module 322 may provide a web interface for client devices 310 to access (e.g., via an application 316) and allow a user to manipulate content items stored within content management system 320. In this way, the user can directly manipulate content items stored within content management system 320.

In some possible implementations, data storage system 328 may store content items such as those uploaded using client devices 310, or using any other suitable computing device. In the example illustrated in FIG. 3, client device 310A, which is associated with a first user, is shown as locally storing at least one content item 314A, and client device 310B, which is associated with a second user, is shown as locally storing at least one content item 314B. As shown in FIG. 3, a copy of the locally stored content item 314C may be maintained in data storage system 328 of content management system 320.

In the example of FIG. 3, content items 314A, 314B and 314C may be local versions of the same shared document that reside on client devices 310A, 310B and content management system 320, respectively. Note that client devices 310A and 310B may also store other content items that are replicated on content management system 320, but are not shared with other client devices.

In some possible implementations, data storage system 328 may maintain information identifying the user, information describing the user's file directory, and other information in a file journal that is maintained for each user.

In some possible implementations, the file journal may be maintained on content management system 320, and in other embodiments, a file journal (e.g., a "server-side file journal") may be maintained on both content management system 320 and locally on each client device 310.

In some possible implementations, the file journal may be used to facilitate the synchronization of the various copies of a particular content item that are associated with a user's account.

As a particular example, in the example of in FIG. 3, the content management system 320 may be configured so that any changes that are made to content item 314A on particular client device 310A may also be automatically reflected in the copy of content item 314C stored within content management system 320 and the copy of the content item 314B on client device 310B. Similarly, any changes that are made to content item 314C on content management system 320 may also be automatically reflected in the copy of content item 314A stored on client device 310A, and the copy of content item 314B stored on client device 310B.

Also, content items 314A and 314B may be stored in local caches within content management clients 312A and 312B, respectively. Alternatively, content items 314A and 314B may be stored in local file systems within content management clients 312A and 312B. In some situations, content items 314A and 314B may be stored in file system space that is reserved for content management clients 312A and 312B. In other situations, content items 314A and 314B may be stored in normal file system space that is not reserved for content management clients 312A and 312B.

In some possible implementations, account module 324 may track content items stored in data storage system 328 and entries in the server-side file journal for each content item. As users grant content item access permissions to other users, account module 324 may update the server-side file journal associated with each relevant user in data storage system 328.

Account module 324 may also track client devices 310 that are associated with each user's account. For example, a user may want to share all their content items among their desktop computer, tablet computer, and mobile device. To make such a sharing arrangement seamless to the user, the user's single account on content management system 320 may be associated with each of the user's respective client devices.

In some possible implementations, an application running on each respective client device 310 may help to coordinate synchronization of content items on the client device with corresponding versions of the content items within the user's account in content management system 320, and also with corresponding versions of the content items stored on the user's various other client devices.

In some possible implementations, content item updating module 326 may be configured to maintain consistency among different copies (versions) of a content item 314A, 314B and 314C that are located in client device 310A, client device 310B and content management system 320, respectively. This can be complicated, because the different versions 314A, 314B and 314C of the same shared content items may be simultaneously changed at client devices 310A-B and content management system 320. Hence, content management system 320 may need to enforce an updating policy to resolve conflicting updates to different versions of the same content item. For example, the copy of the content item 314C on content management system 320 can be the master copy of the content item, and updates to the various copies 314A and 314B of the content item can be serialized and applied one-at-a-time to the master copy 314C before being propagated back to the copies 314A and 314B located on client devices 310A and 310B.

Hosting Facility Infrastructure

Figure 4:
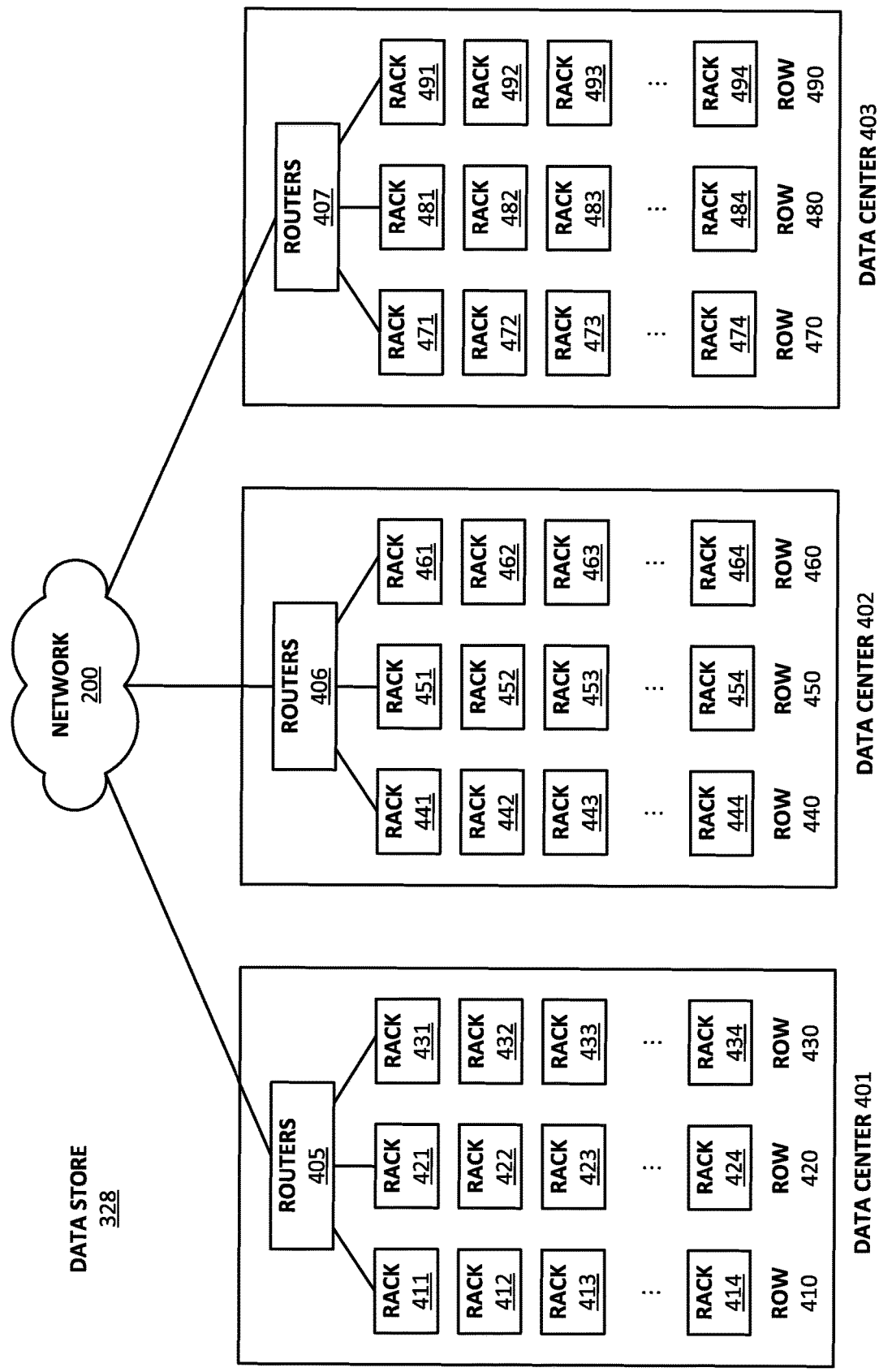
FIG. 4 depicts an example data storage system that encompasses a set of data centers, according to some possible implementations of the present invention.

One or more data centers may provide the infrastructure for the content item block storage system. FIG. 4 illustrates an example data storage system 328 (from FIG. 3) that encompasses a set of data centers 401-403, according to some possible implementations of the present invention.

It should be noted that data storage system 328 can be smaller than data storage system 328 as illustrated in FIG. 4. For example, data storage system 328 can comprise a single server that is connected to a number of data storage media devices, a single rack that houses a number of servers, a row of racks, or a single data center with multiple rows of racks.

Data storage system 328 can include a set of geographically distributed data centers 401-403 that may be located in different states, different countries or even on different continents.

Data centers 401-403 may be coupled together through a network 400, wherein network 400 can be a private network with dedicated communication links, or a public network, such as the Internet, or a virtual-private network (VPN) that operates over a public network.

Communications to each data center pass through a set of routers that route the communications to specific storage nodes within each data center. More specifically, communications with data center 401 pass through routers 405, communications with data center 402 pass through routers 406, and communications with data center 403 pass through routers 407.

As illustrated in FIG. 4, routers 405-407 may channel communications to storage devices within the data centers, wherein the storage devices are incorporated into servers that are housed in racks, wherein the racks are organized into rows within each data center. For example, the racks within data center 401 are organized into rows 410, 420 and 430, wherein row 410 includes racks 411-414, row 420 includes racks 421-424 and row 430 includes racks 431-434. The racks within data center 402 are organized into rows 440, 450 and 460, wherein row 440 includes racks 441-444, row 450 includes racks 451-454 and row 460 includes racks 461-464. Finally, the racks within data center 403 are organized into rows 470, 480 and 490, wherein row 470 includes racks 471-474, row 480 includes racks 481-484 and row 490 includes racks 491-494.

As illustrated in FIG. 4, data storage system 328 may be organized hierarchically, comprising multiple data centers, wherein machines within each data center are organized into rows, wherein each row includes one or more racks, wherein each rack includes one or more servers, and wherein each server (also referred to herein as an "object storage device" (OSD)) includes one or more data storage media devices (e.g., one or more hard disks).

Data Storage System

Figure 5:
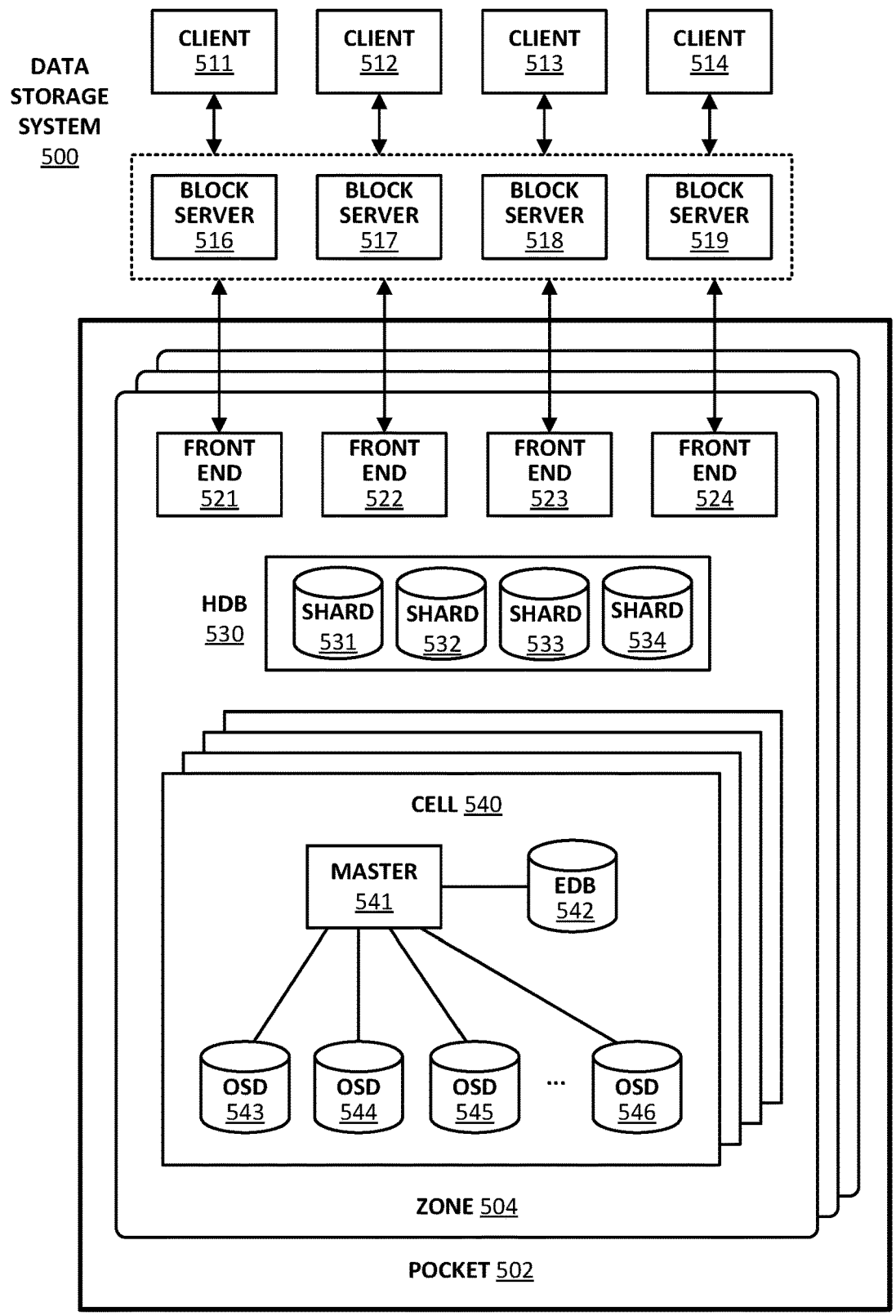
FIG. 5 illustrates the logical structure of an example data storage system in which the techniques disclosed herein for fair data scrubbing may be implemented, according to some possible implementations of the present invention.

FIG. 5 illustrates the logical structure of an example data storage system 500 in which the techniques for fair data scrubbing may be implemented, according to some possible implementations of the present invention.

As illustrated in FIG. 5, data storage system 500 may include a logical entity called a "pocket" 502. Logically, each pocket may be completely distinct, and nothing may be shared between pockets. For example, in some possible implementations, system 500 provides a "block storage pocket" to store data files, and a "thumbnail pocket" to store thumbnail images for data objects. Note that the applications specify which pockets are to be accessed.

Within a pocket one or more "zones" may exist that are associated with physical data centers, and these physical data centers can reside at different geographic locations. For example, one data center might be located in California, another data center might be located in Virginia, and another data center might be located in Europe. For fault-tolerance purposes, data can be stored redundantly by maintaining multiple copies of the data on different servers within a single data center and also across multiple data centers.

For example, when a data item first enters a data center, it can be initially replicated to improve availability and provide fault tolerance. It can then be asynchronously propagated to other data centers.

Note that storing the data redundantly can simply involve making semantic mirrors of data items, or alternatively using a more space-efficient encoding scheme, such as erasure codes (e.g., Reed-Solomon codes) or Hamming codes to provide fault tolerance.

Within each zone (such as zone 504 in FIG. 5), there may exist a set of front ends 521-524, a hash database (HDB) 530 and a set of "cells," such as cell 540 illustrated in FIG. 5. A typical cell 540 includes a number of object storage devices (OSDs) 543-546, wherein the individual OSDs 543-546 may include storage devices that actually store content item blocks.

Cell 540 may also include a "master" 541, which may be in charge of managing OSDs 543-546 and an extent database (EDB) 542 described in more detail below. Note that HDB 530 and EDB 542 may be logical databases which can be stored redundantly in multiple physical databases to provide fault tolerance.

Master 541 may perform a number of actions. For example, master 541 can determine how many writeable extents the system has at any point in time. If system 500 runs out of extents, master 541 can create new extents and allocate them to the storage devices. Master 541 can also monitor OSDs and associated storage devices, and if any OSD or storage device fails, master 541 can migrate the associated extents to other OSDs. In this case, where an extent is migrated to another OSD, the extent may be considered never scrubbed data at the extent's new OSD until the data is data scrubbed for the first time at the extent's new OSD.

As illustrated in FIG. 5, a number of block servers 516-519, which are typically located in a data center associated with a zone, can service requests from a number of clients 511-514. For example, clients 511-514 can comprise applications running on client machines and/or devices that access data items in data storage system 500. Block servers 516-519 in turn can forward the requests to front ends 521-524 that may be located within specific zones, such as zone 504 illustrated in FIG. 5. Note that clients 511-514 may communicate with front ends 521-524 through block servers 516-519, and the front ends 521-524 may be the only machines within the zones that have public IP addresses.

Files to be stored in data storage system 500 may comprise one or more content item blocks that are individually stored in data storage system 500. For example, a large file can be associated with multiple content item blocks, wherein each content item block may be 1 MB to 4 MBs in size.

Moreover, each content item block may be associated with a "hash" that serves as a global identifier for the content item block. The hash can be computed from the content item block by running the content item block through a hash function, such as a SHA-256 hash function. The SHA-256 hash function is defined as a Federal Information Processing Standard (FIPS) by the U.S. National Institute of Standards and Technology (NIST). The hash may be used by data storage system 500 to determine where the associated content item block may be stored.

Get Operation

System 500 may perform a number of operations while processing data accesses on behalf of clients 511-514. For example, when a get( ) operation is received along with an associated hash, the hash may be used to perform a lookup in HDB 530. This lookup may return an identifier for an extent and associated cell where the content item block is stored.

To streamline failure-recovery operations, a large number of content item blocks can be aggregated into larger extents. For example, a number of 1-4 MB content item blocks can be aggregated into a single 1 GB extent, wherein each extent may be stored in a specific cell. This can enable the system to manipulate a small number of extents during a failure-recovery operation instead of manipulating a large number of individual content item blocks. Aggregating content item blocks into extents can also greatly decrease the amount of metadata the system has to maintain and manipulate; this may be advantageous because metadata is computationally expensive to maintain and manipulate.

Because a large number of content item blocks can exist in system 500, HDB 530 can be potentially be very large. If HDB 530 is very large, it can be advantageous to structure HDB 530 as a "sharded" database. For example, when performing a lookup based on a hash in HDB 530, the first 8 bits of the hash can be used to associate the hash with one of 256 possible shards, and this shard can be used to direct the lookup to an associated instance of HDB 330.

For example, as illustrated in FIG. 5, HDB 530 can comprise 4 instances 531-534, wherein instance 531 is associated with shards 1-64, instance 532 is associated with shards 65-128, instance 533 is associated with shards 129-192 and instance 534 is associated with shards 193-256.

In some possible implementations, HDB 530 can be divided into more or fewer instances. Note that a zone can include a "ZooKeeper™ cluster" that is responsible for mapping shards to specific target cells and also mapping shards to physical HDB machines.

HDB instances 531-534 may be logical databases that are mapped to physical databases, and to provide fault tolerance, each logical database can be redundantly stored in multiple physical databases. For example, in some possible implementations, each HDB instance may map to three physical databases. If system 500 is very large (for example containing trillions of content item blocks), HDB 530 may be too large to fit in random-access memory. In this case HDB 530 will mainly be stored in non-volatile storage, which for example, can comprise flash drives or disk drives.

After the extent and associated cell are identified for the get( ) operation, system 500 may perform a lookup in an extent database (EDB) 542 in the associated cell 540. This lookup may return an identifier for an object storage device (OSD) 543 where the extent may be located. Note that because each extent may be fairly large (e.g., 1 GB) and may contain a large number of content item blocks, EDB 542 may be relatively small and may be stored in random-access memory, which can greatly speed up the lookup process.

Finally, within the OSD, system 500 may perform a lookup based on the extent and the hash to determine an offset and a length for the content item block in a write-ahead log that stores content item blocks for the extent. System 500 may then return the content item block from the determined offset in the write-ahead log. Note that because system 500 may be designed to store "immutable data" that does not change after it is written, it can be more efficient to store the immutable data in a write-ahead log, as opposed to a random-access structure. Because the data may not be overwritten, writes may not require more complex and time-consuming random-access lookup mechanisms.

Put Operation

During a put( ) operation, system 500 may receive a content item block to be written from a client. To process the put( ) operation, system 500 may first compute a hash from the content item block, for example using the SHA-256 technique described above. Next, system 500 may select a writeable extent and an associated cell for the content item block. Note that front ends 521-524 periodically poll all the EDBs to identify and then cache writeable extents. This can enable front ends 521-524 to keep track of a number of extents (e.g., 10 to 100 extents) that they know are writeable at any given time. Then, when a put( ) operation is subsequently received, a front end may simply select a cached extent that it knows is writable.

Within the associated cell, system 500 may use an identifier for the selected extent to perform a lookup in the EDB. This lookup may return one or more OSDs for the extent. Note that the extent may be replicated across multiple OSDs to provide fault tolerance. Within the OSDs, system 500 may append the content item block to a write-ahead log that stores content item blocks for the extent. After the data is stably written to the OSDs, system 500 may write the hash-to-extent mapping to the HDB 530.

Note that the master 541 may modify the EDB 542 and the front end 521 may modify the HDB 530. In general, master 541 may be concerned with reliability of storage, and hence may perform operations to facilitate redundancy and rebalancing, while the front end 521 may be generally concerned with finding information and may simply map hashes to logical constructs, such as extents.

Master 541 may perform various operations to detect and handle failures. More specifically, master 541 may periodically perform health checks on OSDs. If master 541 detects a failure in an OSD, the associated extents may be degraded and the master may set the extents to be non-writable. Note that get( ) operations nay have to access the extents where the blocks are stored, but put( ) operations can be directed to any extent that is currently writeable, so when a problem happens with an extent, system 500 simply may mark the extent as non-writeable. System 500 can continue performing get( ) operations on the degraded extent, because there exist multiple copies of the degraded extent.

To handle a failure associated with an extent, master 541 may tell the associated OSDs to freeze the extent. Master 541 may then tell the OSDs to replicate the extent to a new OSD. System 500 may then add the new OSD to the cluster, increment the generation number for the OSD, and mark the extent as writeable. Note that when a degraded OSD is restarted after a failure, it may not accept any reads because its generation number is old. System 500 may guarantee that every OSD in the current generation has valid data. Also note that in this case where an extent is replicated to a new OSD, the extent may be considered never scrubbed data at the extent's new OSD until the data is data scrubbed for the first time at the extent's new OSD.

System 500 may also include mechanisms to perform compaction operations. Although the data stored in system 500 may be immutable, system 500 may often need to delete data items when users remove them from the system. In some possible implementations, system 500 tracks deleted data items in a log, and when the usable storage in a given extent falls below a threshold, system 500 compacts the extent. In this case, where an extent is compacted, the extent may be considered never scrubbed data after the extent is compacted. This is so even if, prior to the compaction operation, the extent was considered already scrubbed data. The reason for this is that the compaction operation can result in the extent being stored on different portion of a hard disk or on a new hard disk, perhaps even at a new OSD in system 500.

Object Storage Device

Figure 6A:
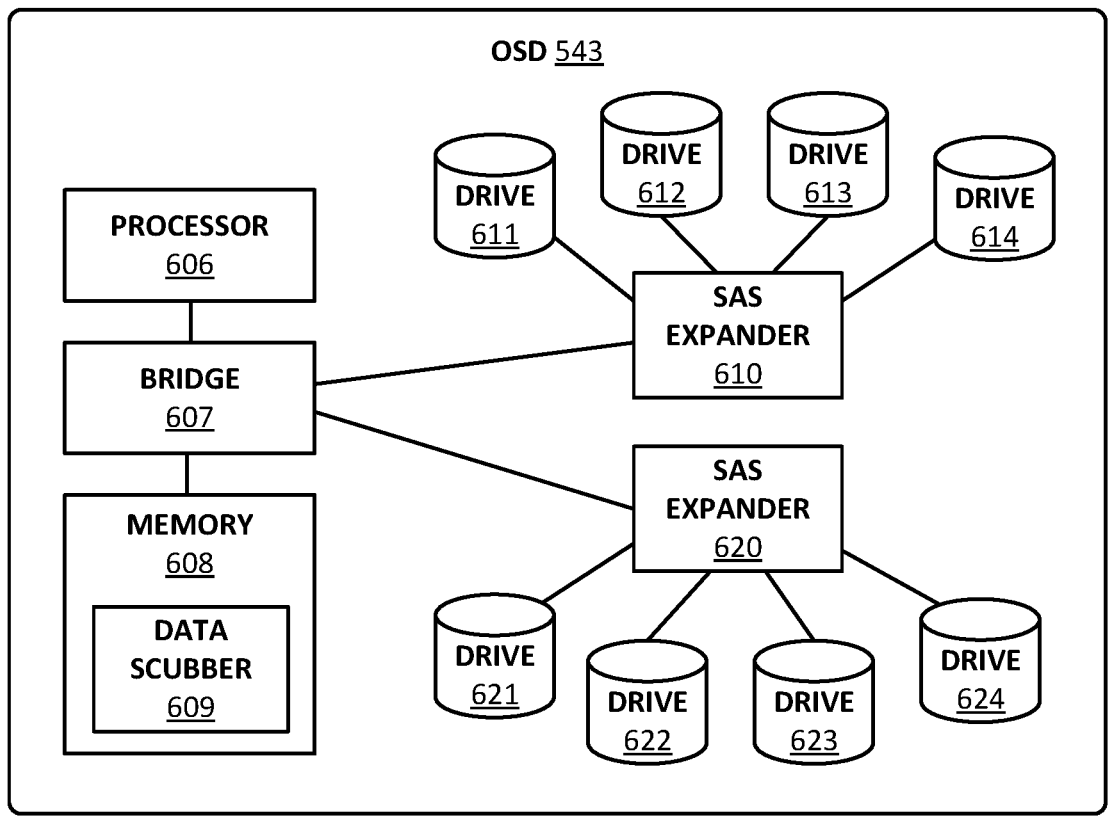
FIG. 6A depicts an example object storage device that executes a data scrubbing program, according to some possible implementations of the present invention.

FIG. 6A illustrates the structure of an example object storage device (OSD) 543 in accordance with some implementations of the present invention. As illustrated in FIG. 6A, OSD 543 may include a processor 606 that is connected to a memory 608 through a bridge 607.

Processor 606 is also coupled to Serial Attached SCSI (SAS) expanders 610 and 620, where SAS expander 610 is coupled to data storage media devices (e.g., hard disks) 611-614 and SAS expander 620 is coupled to data storage media devices (e.g., hard disks) 621-624. Note that SAS expanders 610 and 620 may be coupled to more or fewer hard disks.

A data storage media device (e.g., 6110-614, 621-624) can be, but is not required to be, a hard disk. The hard disk can be based on conventional magnetic recording (CMR), perpendicular magnetic recording (PMR), shingled magnetic recording (SMR), or heat-assisted magnetic recording (HAMR) storage technology conventional Perpendicular Magnetic Recording (PMR) hard disk drive. The system may have a mix of different types of hard disks. Further, a hard disk in the system is not limited to any particular magnetic storage technology. In some possible implementations, a hard disk may have a fourteen (14) terabyte capacity. However, a hard disk can have greater or smaller capacity. And different hard disks in the system can have different storage capacities.

Memory 608 may store data scrubbing program 609 which may be executed by processor 606 as a "data scrubbing" process. When executed at OSD 543, data scrubbing program 609 can perform techniques disclosed herein for fair data scrubbing when data scrubbing a data storage media device of OSD 543. Each OSD in system 500 may execute a data scrubbing program for data scrubbing the data storage media devices of the OSD.

Data scrubber program 609 can data scrub each data storage media device (e.g., 611-614 and 621-624) of OSD 543. When data scrubbing data stored on a hard disk, data scrubber program 609 can read data from the data storage media device according to a sequential scan pattern in order to minimize disk seeking, which can impact disk I/O for other processes accessing the hard disk. A hard disk may seek to different areas of the hard disk when data scrubbing program 609 switches between data being data scrubbed. For example, data scrubber program 609 may sequentially read first data (e.g., a first extent) from disk that is stored sequentially on the hard disk when data scrubbing the first data, then cause the hard disk to seek to the beginning of second data (e.g., a second extent) that is stored sequentially on the hard disk, and then sequentially read second data from the hard disk when data scrubbing the second data.

Data scrubber program 609 may data scrub the data storage media devices of OSD 543 concurrently or in parallel. For example, data scrubber program 609 may allocate separate threads of execution to each data storage media device of OSD 543. Each thread may separately perform the techniques disclosed herein for fair data scrubbing of that respective data storage media device on which the thread operates. As an alternative to separate threads, separate data scrubbing processes may be used.

Figure 6B:
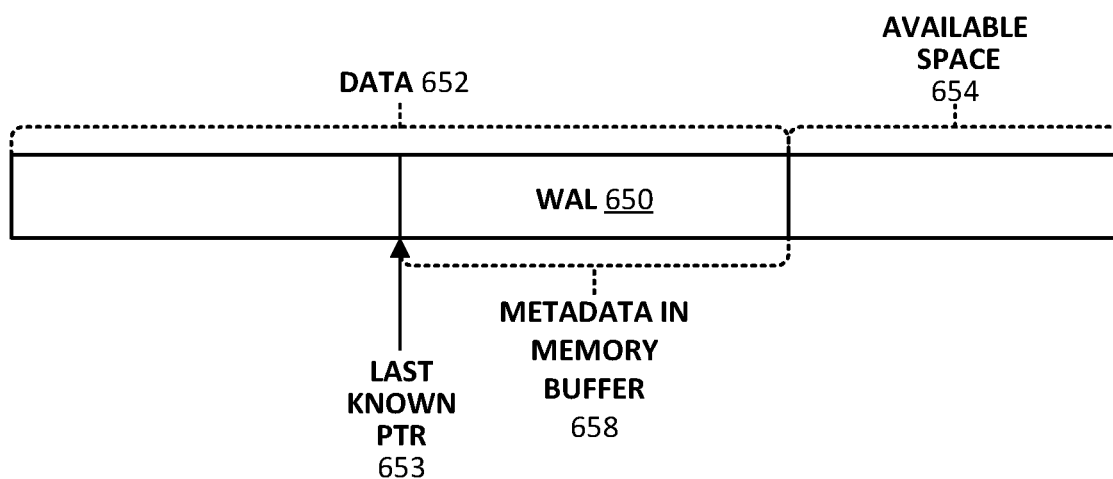
FIG. 6B illustrates a write-head log, according to some possible implementations of the present invention.

FIG. 6B illustrates the structure of an example write-head log (WAL) 650 which may be maintained with an OSD (e.g., OSD 543), according to some possible implementations of the present invention.

WAL 650 provides a log-structured data store which may be advantageous for storing immutable data. WAL 650 may include one or more 1 GB extents. As illustrated in FIG. 6B, an extent can include a "data portion" 652 that has already been written to, and an unwritten portion that contains available space 654. The content item blocks that are stored within data portion 652 are associated with metadata that, for example, contains hashes and the offsets for the content item blocks. To improve performance, metadata associated with recently written content item blocks 658 can be stored in a memory buffer. When the system recovers from a failure, all of the metadata can be reconstructed by scanning through WAL 650 starting from a last known pointer 653.

During a put( ) operation, system 500 may synchronously append the content item block and an associated header to the WAL 650, wherein the header includes a number of data items associated with the content item block, including the hash and the length of the content item block. At the same time, system 500 may synchronously add metadata to the memory buffer. When an extent becomes full, system 500 may seal the extent, and the extent may not get modified again.

During a get( ) operation, system 500 may check the memory buffer to find the offset and length for the content item block. The system may then use the offset and length to read the content item block from WAL 650.

Quiesced on a Data Storage Media Device

In some possible implementations, an extent on a data storage media device can be in an internally mutable "open" state or in an internally immutable "closed" state. When the extent is in the open state, content item blocks can be written to (e.g., appended to) the extent.

When the extent is in the closed state, content items block can no longer be written to (e.g., appended to) the extent. However, a limited set of maintenance operations may still be performed on the extent when the extent is in the closed state. These maintenance operations may include, but are not limited to, moving or copying the closed extent to different areas of a data storage media device or between data storage media devices, merging the closed extent with another closed extent, data scrubbing and repairing the closed extent, compacting the closed extent, compressing the closed extent, encrypting the closed extent, erasure-coding the closed extent, and/or garbage-collecting deleted content item blocks from the closed extent. Thus, while a closed extent may be internally immutable in some respects such as, for example, appending new content item blocks to the extent, the closed extent may be externally mutated by maintenance operations performed on the extent which may cause data on a data storage media device within the extent to be changed, modified, or deleted.

In some possible implementations, an extent is transitioned from the open state to the closed state after the extent becomes full of content item blocks and content item blocks can no longer be written to (e.g., appended to) the extent. For example, a one (1) gigabyte extent may be transitioned to the closed state when one (1) gigabyte's worth of content item blocks are stored in the extent. An example data storage system supporting open and closed extents is described in related U.S. patent application Ser. No. 14/497,195, now U.S. Pat. No. 9,720,607, filed Sep. 25, 2014, and entitled "Append-Only Storage System Supporting Open and Closed Extents," the entire contents of which is hereby incorporated by reference.

In some possible implementations, when an extent is successfully transitioned from the open state to the closed state, it may then be considered never scrubbed data that is quiesced on a data storage media device. Before all of the data of the extent is quiesced on the data storage media device, the data may be in a process of being written to the data storage media device and not yet fully written to the data storage media device. For example, when the extent is not yet full of content item blocks, content item blocks may still be written to (e.g., appended to) the extent.

In the case where not all of the data of the an extent is yet written to the data storage media device, it may be sub-optimal to data scrub the part of the data that is currently quiesced on the data storage media device if it is expected that more of the data will be quiesced on the data storage media device in the future. For example, due to the relatively high cost of hard disk seeks, it may be sub-optimal to data scrub the part of the data that is currently on a hard disk and then later data scrub the remaining part of the data after it is written to the hard disk. Thus, for efficiency, the data scrubbing process may wait until all of the data of the extent is quiesced on a data storage media device before data scrubbing the extent.

While in some possible implementations, an extent is considered quiesced on a data storage media device after it has been successfully transitioned to a closed state, in other implementations an extent can be considered quiesced on the data storage media device under other conditions. For example, an extent may be considered quiesced on the data storage media device when all of the data is stored in non-volatile storage buffers of the data storage media device and none of the data remains only in in-memory write caches of the data storage media device and all of the following conditions are met for the extent, or a subset of these conditions are met, or a superset of a subset of these conditions is met:

the extent is considered read-only, and/or
the extent is successfully transitioned to a closed state.

In some possible implementations, an extent is not completely transitioned to the closed state and not considered in the closed state until a number of operations have been successfully performed on the extent. Thus, there may be a significant period of time (e.g., hours) between when an extent is full of content item blocks and when the extent is quiesced on a data storage media device.

Recall that multiple semantic mirrors of an extent can exist on multiple physically isolated data storage media devices and that a new content item block can be written to (e.g., appended to) each of the semantic mirrors for redundancy. After the extent is full of content item blocks, the transition operations may include synchronizing the multiple semantic mirrors of the extent mirrored on multiple physically isolated hard disks such that each of the semantic mirrors contain the same set of content item blocks (but necessarily in the same order). In some possible implementations, master 541 of cell 540 coordinates this synchronization among the multiple copies stored at OSDs of cell 540. An example synchronization process that master 541 may perform to ensure that all copies of an extent contain the same data blocks is described in related U.S. patent application Ser. No. 14/497,212, now U.S. Pat. No. 9,690,823, filed Sep. 25, 2014, and entitled "Synchronizing Copies of an Extent in an Append-Only Storage System," the entire contents of which is hereby incorporated by reference as if fully set forth herein.

In some possible implementations, the transition operations may include constructing an index for each semantic mirror of the extent to facilitate fast lookups of content item blocks contained in the semantic mirror. The constructed index may be stored in the semantic mirror of the extent itself on a data storage media device.

In some possible implementations, the transition operations may include adding or modifying data in a header or other portion of each semantic mirror of the extent on a data storage media device to indicate that the semantic mirror of the extent is in the closed state.

Figure 7:
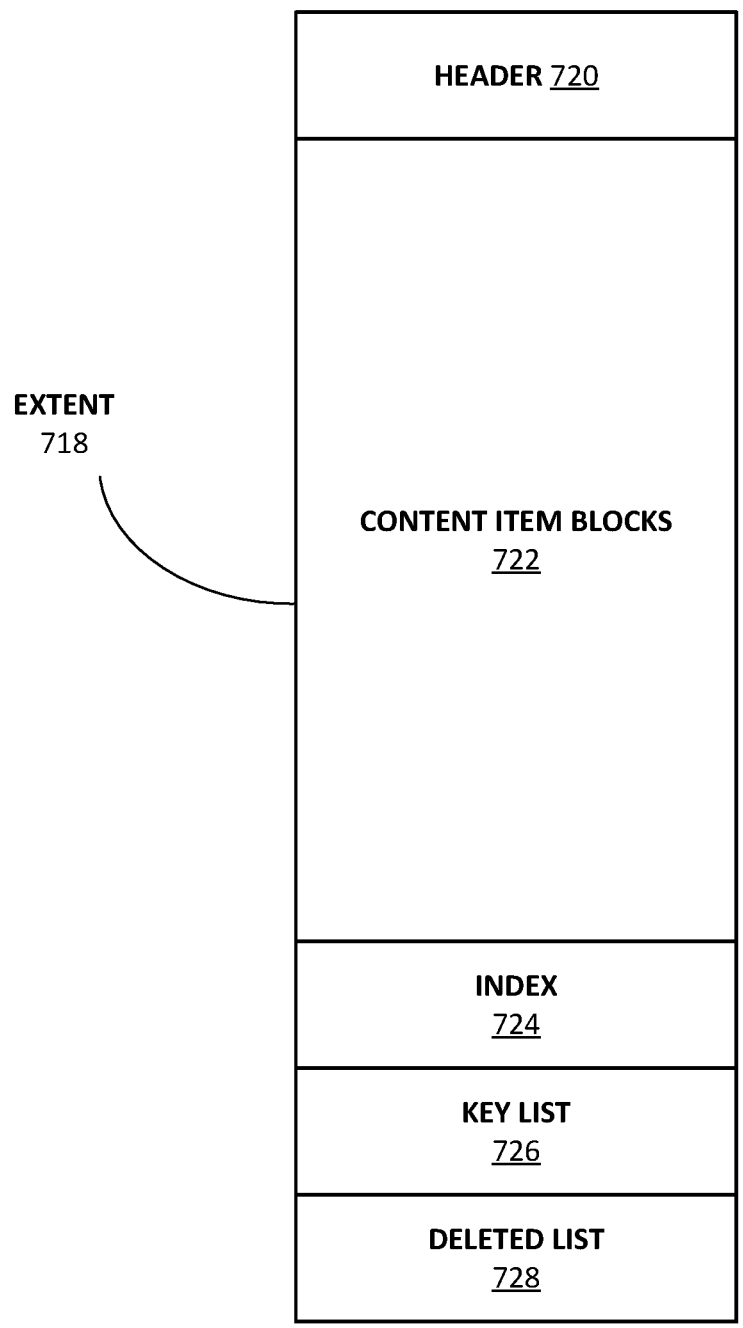
FIG. 7 depicts a closed extent quiesced on a data storage media device, according to some possible implementations of the present invention.

FIG. 7 illustrates the structure of an example closed extent 718 that is quiesced on a data storage media device in accordance with some possible implementations of the present invention. Extent 718 includes a header that contains various metadata associated with the extent, including data indicating that extent 718 is in closed state and including offsets for an index, a key list, and a deleted list, which are described in more detail below.

Extent 718 also includes a set of data blocks 722, which has been appended to the extent. Note that each semantic mirror of the extent may contain the same set of data blocks after the synchronization operation described above. However, system 500 may not perform any serialization operations while writing to the different semantic mirrors of the extent, so the data blocks may be appended to each semantic mirror of the extent in a different order.

Extent 718 also includes an index 724 that facilitates looking up locations for data blocks in the extent. In general, any type of indexing structure can be used for this purpose. In some possible implementations, index 724 is implemented using a hash table, wherein each entry in the hash table may be accessed using a hash key for the associated content item block in set of content item blocks 722. Moreover, each hash table entry may specify an offset and a length for the content item block within extent 718 to facilitate subsequently accessing the content item block.

In some possible implementations, index 724 is a variation of a cuckoo hash table that can be accessed to retrieve a content item block of content item blocks 722. The variation of the cuckoo hash table may not actually store a full copy of the hash key for each content item block. The full hash keys are instead stored in associated key list 726. Within key list 926, the hash keys are stored in the order that their corresponding entries appear in the hash table.

Extent 718 also includes a deleted list 728 that may specify locations in index 724 for content item blocks that may have been garbage-collected from extent 718.

When closing extent 718, system 500 can also compute and store internal checksums to cover the header 720, the content item blocks 722, the index 724 and the key list 726. These internal checksums can facilitate detecting subsequent data corruption errors in extent 718 during data scrubbing operations on extent 718.

When data is just quiesced on a data storage media device, it may be considered never scrubbed data. The data is then considered never scrubbed data until it is data scrubbed. Then, it may be considered already scrubbed data. One example of when data may be quiesced on a data storage media device is when the data is transitioned to a closed state or read-only state such as, for example, described above in the context of extents. However, there are other situations under which data is quiesced on a data storage media device and, thus, may be considered never scrubbed data.

For example, after an extent is transitioned to the closed state, one or more of the maintenance operations discussed above may be performed on the extent that cause the extent or a portion or portions therefore to be written or rewritten to a data storage media device. For example, the extent might be moved or copied to different areas of a data storage media device or between data storage media devices, merged with another extent, repaired, compacted, erasure-coded, and/or content item blocks in the extent garbage collected.

All of these maintenance operations may involve writes of data to a data storage media device. Thus, in some implementations, after a maintenance operation is performed on an extent, it may be considered quiesced on the data storage media device after the maintenance operation is successfully completed. The reason for considering data on which a maintenance operation is performed as never scrubbed data is that the writes to the data storage media device involved in completing the maintenance operation might have introduced data storage media device disk errors to the data. Thus, data scrubbing the data after the maintenance operation is performed on the data can be useful to catch any such introduced errors.

Never Scrubbed Data and Already Scrubbed Data

Figure 8:
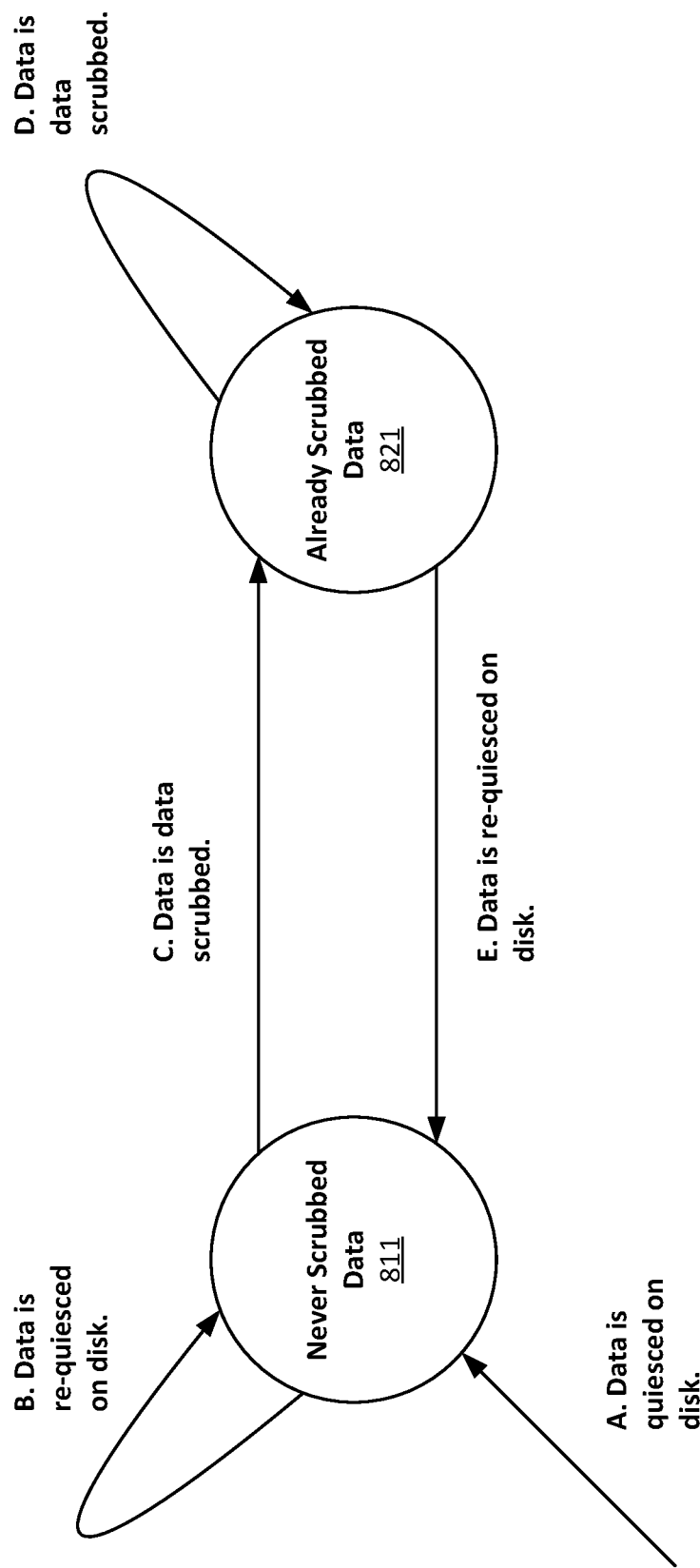
FIG. 8 illustrates a state diagram for never scrubbed data and already scrubbed data, according to some possible implementations of the present invention.

FIG. 8 illustrates a state diagram for never-scrubbed data and already scrubbed data, according to some possible implementations of the present invention. Initially, data that is A. quiesced on a data storage media device starts as never scrubbed data 811. As discussed above, the data may be quiesced on the data storage media device, for example, by being written to the data storage media device, by being written to the data storage media device and transitioned to a read-only state, by being written to the data storage media device and transitioned to a closed state, or by being written to the data storage media device and transitioned to a read-only state and a closed state. Note that even if the data is set in a read-only state and/or a closed state, maintenance operations that change, modify, or delete the data on the data storage media device may still be performed on the data.

When the data is A. quiesced on the data storage media device, the data may be associated with a "last quiesced" timestamp that indicates the time the data was A. quiesced on the data storage media device.

When the data is never scrubbed data 811, it may again be never scrubbed data 811 if the data is again B. re-quiesced on the data storage media device. For example, a maintenance operation may be performed on the data such that the data is again B. re-quiesced on the data storage media device. When the data is again B. re-quiesced on the data storage media device, the data may be associated with a new last quiesced timestamp that indicates the time the was again B. re-quiesced on the data storage media device.

The data may transition from never scrubbed data 811 to already scrubbed data 821 when the data is C. data scrubbed for the first time after being A. quiesced on the data storage media device or after being B. re-quiesced on the data storage media device. When the data is C. data scrubbed, it may be associated with a "last scrubbed" timestamp which indicates when the data was C. data scrubbed.

When the data is D. rescrubbed, it may against be associated with a new or updated last scrubbed timestamp which indicates when the data was D. rescrubbed. Note that D. rescrubbing already scrubbed data 821 may not cause already scrubbed data 821 to become never scrubbed data 811. That is, already scrubbed data 821 that is D. rescrubbed may remain already scrubbed data 821. For example, if no errors are detected in already scrubbed data 821 by D. rescrubbing, then already scrubbed data 821 can remain already scrubbed data 821. In some possible implementations, if an error is detected in already scrubbed data 821 by D. rescrubbing, then already scrubbed data 821 is repaired to fix the error and again becomes never scrubbed data 811 as a result of the repair.

The data may transition from already scrubbed data 821 to never scrubbed data 811, if the data is again E. re-quiesced on the data storage media device. For example, a maintenance operation may be performed on the data such that the data is again E. re-quiesced on the data storage media device. When the data is again E. re-quiesced on the data storage media device, the data may be associated with a new or updated last quiesced timestamped that indicates when the data was E. re-quiesced on the data storage media device. The data is then back to being never scrubbed data 811.

It should be understood that when data is re-quiesced on the data storage media device as in, for example, state transitions B. and E. of the state diagram, the data may change form (e.g., by compression, compacting, encryption, erasure-coding) even though the information the data represents does not change. In other cases, the information the data represents changes in addition to the data changing. For example, a repair operation or a garbage collection operation may change the data as well as the information the data represents.

Fair Data Scrubbing Process

Figure 9:
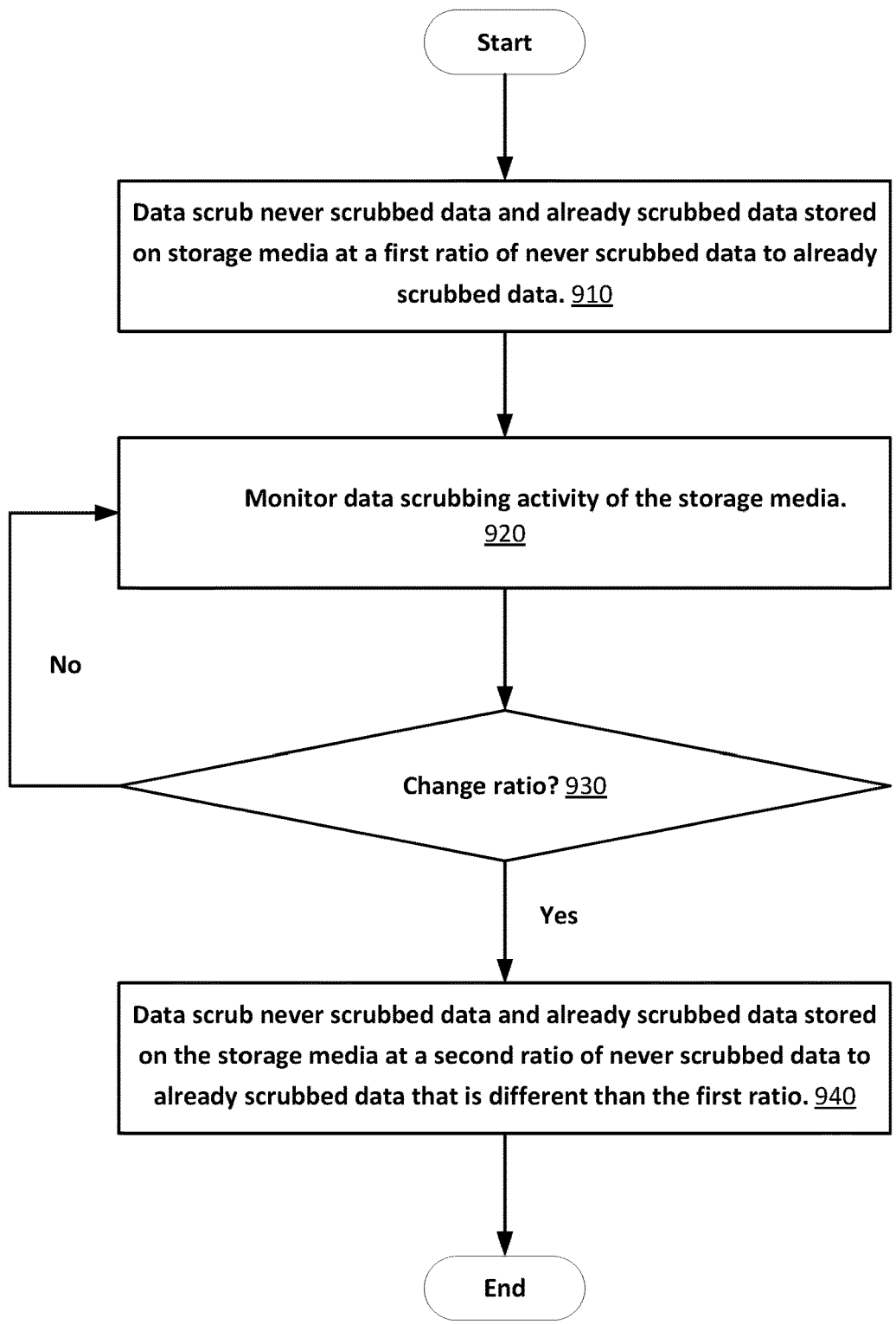
FIG. 9 depicts a flowchart of a process for fair data scrubbing, according to some possible implementations of the present invention.

FIG. 9 is a flowchart of an example process for fair data scrubbing, according to some possible implementations of the present invention. The process may be performed on a single hard disk or other type of volatile or non-volatile data storage media device. For example, the process may be performed by data scrubbing program 609 executing at object storage device 543 on a data storage media device (e.g., 622) of object storage device 543. Note that the process may be performed in parallel or concurrently for multiple data storage media devices. For example, multiple data scrubbing programs 609 or multiple threads of a data scrubbing program 609 executing at object storage device 543 can data scrub multiple data storage media devices of object storage device 543 concurrently or in parallel.

At a high-level, the process includes the step of data scrubbing 910 never scrubbed data and already scrubbed data stored on a target data storage media device at a first ratio of never scrubbed data to already scrubbed data. Data scrubbing activity of the target data storage media device is monitored 920. If the data scrubbing activity monitored is such that the ratio of data scrubbing never scrubbed data to already scrubbed data should be changed 930, then the process data scrubs 940 never scrubbed data and already scrubbed data stored on the target data storage media device at a second ratio of never scrubbed data to already scrubbed data, where the second ratio is different (i.e., higher or lower) than the first ratio. Otherwise, the process continues to monitor 920 data scrubbing activity of the target data storage media device until it is determined 930 that the ratio should be adjusted.

First Data Scrubbing Ratio

Returning to the top of the process, at operation 910, never scrubbed data and already scrubbed data stored on the target data storage media device is data scrubbed at a first ratio of never scrubbed data to already scrubbed data.

The first ratio can be various. For example, the first ratio can be approximately equal (e.g., one for one) such as in a state where the rate at which new data is being quiesced on the target disk is relatively low or not disproportionately greater than the data scrubbing rate. If the first ratio is this way, then it can be said that the first ratio is neutral (no or little bias) toward never scrubbed data or already scrubbed data. When the first ratio is this way, it may be useful to balance between data scrubbing never scrubbed data and already scrubbed data such that never scrubbed data is data scrubbed soon after it is quiesced on the target data storage media device and before it is erasure coded and so that already scrubbed data is data scrubbed within a maximum guaranteed scrub latency such as, for example, a maximum guaranteed scrub latency required by a service level agreement (SLA).

An implementation of the first ratio where it is equal can be made by alternative selections of never scrubbed data and already scrubbed data for data scrubbing. Alternatively, an implementation of the first ratio where it is approximately equal can be made by randomly selecting never scrubbed data or already scrubbed data to data scrub next based on a random number generator configured to select never scrubbed data and already scrubbed data with approximately equal probability. In this description, approximately equal encompass both exactly equal and practically equal according to the requirements of the implementation at hand (e.g., within a standard deviation of exactly equal or within an industry standard margin of exactly equal.)

Alternatively, the first ratio can be such that for every unit of never scrubbed data that is data scrubbed, multiple units of already scrubbed data are data scrubbed. A unit can be an extent, for example, or other logical unit of data quiesced on the target storage media device. A unit can also correspond to a physical unit of data quiesced on the target storage media device. For example, a unit can be a sector, block, extent, or volume of the target storage media device. The first ratio may be this way in a state where the rate at which data is being quiesced on the target data storage media device is relatively low or not disproportionately greater than the data scrubbing rate and some already scrubbed data on the target data storage media device may, or is about to exceed, or has exceeded a maximum guaranteed scrub latency for already scrubbed data. If the first ratio is such, it can be said that it is biased toward already scrubbed data. The first ratio may be biased toward already scrubbed data to avoid violating a maximum guaranteed scrub latency for all already scrubbed data on the target data storage media device.

An implementation of the first ratio where it is biased toward already scrubbed data can be made by selecting X times the number of already scrubbed data for data scrubbing for every one never scrubbed data selected for data scrubbing. For example, X may be two, three, three and one-half, five, seven, eleven, thirteen, seventeen, etc. For example, if X is three, then three already scrubbed data may be data scrubbed, then one never scrubbed data may be data scrubbed, and then another three already scrubbed data may be data scrubbed, and so on. It is also possible to select only already scrubbed data to data scrub and not select never scrubbed data to data scrub for a period of time when the first ratio is biased toward already scrubbed data. Alternatively, an implementation of the first ratio where it is biased toward already scrubbed data can be made by randomly selecting never scrubbed data or already scrubbed data to data scrub next based on a random number generator configured to select already scrubbed data with greater probability than never scrubbed data.

As yet another alternative, the first ratio can be such that for every unit of already scrubbed data that is data scrubbed, multiple units of never scrubbed data are data scrubbed. The first ratio may be this way in a state where the rate at which data is being quiesced on the target data storage media device is relatively high or disproportionately higher than the data scrubbing rate and some never scrubbed data on the target data storage media device may, or is about to exceed, or has exceeded a maximum guaranteed scrub latency for never scrubbed data. If the first ratio is configured in this way, it can be said that the first ratio is biased toward never scrubbed data. When the first ratio is this way, it may be useful to ensure that never scrubbed data is data scrubbed before undergoing an operation after which reconstructing the data would be more computationally expensive and/or consume greater networking resource such as, for example, erasure-coding.

An implementation of the first ratio where it is biased toward never scrubbed data can be made by selecting X times the number of never scrubbed data for data scrubbing for every one already scrubbed data selected for data scrubbing. For example, X may be two, three, three and one-half, five, seven, eleven, thirteen, seventeen, etc. For example, if X is three, then three never scrubbed data may be data scrubbed, then one already scrubbed data may be data scrubbed, and then another three never scrubbed data may be data scrubbed, and so on. It is also possible to select only never scrubbed data to data scrub and not select already scrubbed data to data scrub for a period of time when the first ratio is biased toward already scrubbed data. Alternatively, an implementation of the first ratio where it is biased toward never scrubbed data can be made by randomly selecting never scrubbed data or already scrubbed data to data scrub next based on a random number generator configured to select never scrubbed data with greater probability than already scrubbed data.

In some possible implementations, the first ratio is statically configured such as through a configuration file or the like.

In some possible implementations, the first ratio is automatically determined based on detecting a state of the target data storage media device. For example, the data scrubbing program can automatically bias the first ratio toward already scrubbed data if the data scrubbing program detects a state of the target data storage media device where the rate at which data is being quiesced on the target data storage media device is relatively low or not disproportionately greater than the data scrubbing rate and some already scrubbed data on the target data storage media device may, or is about to exceed, or has exceeded a maximum guaranteed scrub latency for already scrubbed data. For example, this state may be detected by comparing the data quiesce rate of the target data storage media device to the data scrubbing rate to determine whether a difference in the rates is below a rate difference threshold combined with detecting a scrub latency for already scrubbed data that meets or exceeds a scrub latency threshold for already scrubbed data (e.g., a threshold at or just lower the maximum guaranteed scrub latency). Alternatively, if the data scrubbing rate is approximately constant, this state may be detected by detecting the data quiesce rate of the target data storage media device is below a data quiesce rate threshold combined with detecting a scrub latency for already scrubbed data that meets or exceeds the scrub latency threshold for already scrubbed data.

Likewise, the data scrubbing program can automatically bias the first ratio toward never scrubbed data if the data scrubbing program detects a state of the target disk where the rate at which data is being quiesced on the target data storage media device is relatively high or disproportionately higher than the data scrubbing rate and some never scrubbed data on the target data storage media device may, or is about to exceed, or has exceeded a maximum guaranteed scrub latency for never scrubbed data. For example, this state may be detected by comparing the data quiesce rate of the target data storage media device to the data scrubbing rate to determine whether a difference in the rates meets or exceeds a rate difference threshold combined with detecting a scrub latency for particular never scrubbed data that meets or exceeds a scrub latency threshold for never scrubbed data. For example, the scrub latency threshold for never scrubbed data can be based on (e.g., approximately equal to) the expected time between quiescing data on the target data storage media device and performing some operation (e.g., erasure coding) on the data after which restoring the data is more difficult and/or more expensive. Alternatively, if the data scrubbing rate is approximately constant, this state may be detected by detecting the data quiesce rate of the target data storage media device meets or exceeds a data quiesce rate threshold combined with detecting a scrub latency for never scrubbed data that meets or exceeds the scrub latency threshold for never scrubbed data.

Data Scrubbing Activity

While data scrubbing never scrubbed data and already scrubbed data on the target data storage media device at operation 910, data scrubbing activity of the target data storage media device may be monitored 920. The data scrubbing activity that may be monitored may include any data scrubbing activity that is indicative of whether the ratio at which never scrubbed data is data scrubbed to already scrubbed data should change from its current ratio (e.g., the first ratio).

Amount of Never Scrubbed Data

In some possible implementations, the data scrubbing activity that may be monitored may include the amount of never scrubbed data that is pending its first data scrub. This monitoring may be accomplished by maintaining a "never scrubbed" set of data structure items in computer storage media. Each item in the never scrubbed set can represent never scrubbed data that is pending its first data scrub. Each item in the never scrubbed set can also be associated with a last quiesced timestamp.

When data is quiesced on the target data storage media device, a new item for the quiesced data can be added to the never scrubbed set and associated with a timestamp indicating when the data was quiesced on the data storage media device. A new item for the data can also be added to the never scrubbed set when data is re-quiesced on the target data storage media device. In this case, the new item can also be associated with a timestamp indicating when the data was re-quiesced on the target data storage media device.

When never scrubbed data is eventually scrubbed, the item for the data can be removed from the never scrubbed set or otherwise manipulated to indicate that the data has undergone its first data scrub since last becoming never scrubbed data.

While a new item can be added to the never scrubbed set when data is re-quiesced on the target data storage media device, an existing item for the never scrubbed data in the new scrubbed set can be updated. This can happen, for example, if the never scrubbed data is re-quiesced on the target data storage media device before the never scrubbed data is data scrubbed after previously being quiesced on the target data storage media device. The update to the existing item may include associating the existing item with a new timestamp indicating when the never scrubbed data was re-quiesced on the target storage media device. Alternatively, when never scrubbed data is re-quiesced on the target data storage media device, the item for the never scrubbed data in the never scrubbed set can be left alone such that the timestamp associated with the item is its original timestamp when the item was added to the never scrubbed set.

Never scrubbed data represented by the never scrubbed set of items can be data scrubbed in order of their associated last quiesced timestamps from least recently quiesced on the data storage media device to most recently quiesced on the data storage media device. Although other data scrubbing orders are possible, and no particular data scrub order is required. For example, never scrubbed data may be data scrubbed in an order in which the never scrubbed data will be erasure coded from soon to be erasure coded to less soon to be erasure coded. In this way, the never scrubbed data on the target data storage media device that will be erasure coded next is data scrubbed first among the never scrubbed data on the target data storage media device.

In some possible implementations, the never scrubbed set of data structure items are stored in a "never scrubbed" priority queue ordered by last quiesced timestamps where the item representing the never scrubbed data that is associated with the least recent last quiesced timestamp has the highest priority in the never scrubbed queue and the item representing the never scrubbed data that is associated with the most recent last quiesced timestamp has the lowest priority in the never scrubbed queue. The other items may have priorities in between based on their associated last quiesced timestamps.

In addition to, or as an alternative to tracking the amount of never scrubbed data by way of data structure items, a counter may be used to track the amount of never scrubbed data. For example, the counter can specify the number of never scrubbed data on the target data storage media device awaiting its first data scrub. In addition, or alternatively, the counter can specify a number of bytes of never scrubbed data on the target disk awaiting its first data scrub.

Amount of Already Scrubbed Data

In some possible implementations, the data scrubbing activity that may be monitored may include the amount of already scrubbed data stored on the target data storage media device that is pending a disk rescrub. This monitoring may be accomplished by maintaining an "already scrubbed" set of data structure items in computer storage media. Each item in the already scrubbed set can represent already scrubbed data that is pending a data rescrub. Each item in the already scrubbed set can also be associated with a last scrubbed timestamp. When never scrubbed data is data scrubbed for the first time, a new item can be added to the already scrubbed set and associated with a last scrubbed timestamp specifying when the now already scrubbed data was data scrubbed for the first time. When the already scrubbed data is eventually rescrubbed, the last scrubbed timestamp can be updated to reflect when the already scrubbed data was rescrubbed. If already scrubbed data is modified such that it is now considered never scrubbed data or if the already scrubbed data is deleted from the target data storage media device, then the item for the already scrubbed data can be removed from the already scrubbed set or otherwise manipulated to indicate that the already scrubbed data does not need to be rescrubbed during a next scrub cycle.

Already scrubbed data represented by the already scrubbed set of items can be data scrubbed in order of their associated last scrubbed timestamps from least recently scrubbed to most recently scrubbed. When the least recently scrubbed already scrubbed data is rescrubbed, the last scrubbed timestamp can be updated to a timestamp that indicates when the already scrubbed data was rescrubbed.

In some possible implementations, the already scrubbed set of data structure items are stored in an "already scrubbed" priority queue ordered by last scrubbed timestamps where the item representing the already scrubbed data that is associated with the least recent last scrubbed timestamp has the highest priority in the already scrubbed queue and the item representing the already scrubbed data that is associated with the most recent last scrubbed timestamp has the lowest priority in the already scrubbed queue. The other items may have priorities in between based on their associated last scrubbed timestamps.

In addition to, or as an alternative to tracking the amount of already scrubbed data by way of data structure items, a counter may be used to track the amount of already scrubbed data. For example, the counter can specify the number of already scrubbed data on the target disk. In addition, or alternatively, the counter can specify a number of bytes of already scrubbed data on the target disk.

Never Scrubbed Latency

In some possible implementations, the data scrubbing activity that may be monitored may include the latency for data scrubbing never scrubbed data. This monitoring may be accomplished, for example, by tracking the time difference between when never scrubbed data is quiesced or re-quiesced on the target data storage media device and when the data is next data scrubbed at the target data storage media device. The never scrubbed latency can be tracked on an individual never scrubbed data basis. In addition, an average never scrubbed latency can be maintained over a window of never scrubbed data. For example, the average never scrubbed latency may reflect the average of the individual never scrubbed latencies over a past period of time (e.g., the past hour, day, week, etc.) or over a most recent number of never scrubbed data that is data scrubbed (e.g., the average of the most recent 10, 20, or 50 never scrubbed data that is data scrubbed.)

Already Scrubbed Latency

In some possible implementations, the data scrubbing activity that may be monitored may include the latency for data scrubbing already scrubbed data. This monitoring may be accomplished by tracking the time difference between when already scrubbed data is rescrubbed at the target data storage media device. The already scrubbed pendency can be tracked on an individual already scrubbed data basis as already scrubbed data is rescrubbed. In addition, an average already scrubbed latency can be maintained over a window of already scrubbed data. For example, the average already scrubbed pendency may reflect the average of the individual already scrubbed latencies over a past period of time (e.g., the past hour, day, week, etc.) or over a most recent number of already scrubbed data that is rescrubbed (e.g., the average of the most recent 10, 20, or 50 already scrubbed data that is data scrubbed.)

Other Data Scrubbing Activity

Other data scrubbing activity may be monitored. For example, all of the following data scrubbing activity may be monitored, a subset of this activity, or a superset of a subset of this activity:
  Data read rate from the target data storage media device (e.g., average bytes per second read from the target data storage media device in a past period/window of time.)
  Data write rate to the target data storage media device (e.g., average bytes per second written to the target data storage media device in a past period/window of time.)
  Data scrubbing rate (e.g., average bytes per second data scrubbed in a past period/window of time.), or
  Input-output operations per second (IOPS).

For the data read rate from disk, data write rate to disk, and IOPS activity, this activity can be monitored exclusive of the activity resulting from the data scrubbing process itself. In this way, the activity by other processes using the target data storage media device can be determined. These other processes may support functions more critical than data scrubbing such as, for example, responding to requests from end-user computing devices.

In some possible implementations, if the data storage media device activity (e.g., reads and writes) of other processes on the target data storage media device increases above a threshold amount of activity, then the data scrubbing rate can be lowered so as to reduce the impact data scrubbing activity has on the data storage media device activity of the other processes. The data scrubbing rate can be raised again to its normal rate after the data storage media device activity of the other processes falls below the threshold amount or another threshold amount.

Adjust Ratio Decision

At operation 930, a decision is made whether to adjust the first data scrubbing ratio to a different second data scrubbing ratio. The decision can be based on the data storage media device activity monitored 920.

In some possible implementations, a decision is made to increase the data scrubbing ratio from the first ratio if the amount of never scrubbed data exceeds a threshold amount. For example, if the number of never scrubbed data awaiting its first data scrub exceeds a first threshold number, then the data scrubbing ratio may be increased until the number of never scrubbed data awaiting its first data scrub falls below a second threshold number. The first threshold number can be equal to or greater than the second threshold number.

The first threshold number and the second threshold number can be selected based on a variety of factors including, but not limited to, a quiesced data rate, a data scrubbing rate, a never scrubbed latency, and an already scrubbed latency. For example, the first threshold number and the second threshold number can be selected so that, for a given quiesced data rate and a given data scrubbing rate, a never scrubbed latency does not exceed a maximum never scrubbed latency and an already scrubbed latency does not exceed a maximum already scrubbed latency. The maximum never scrubbed latency can be based on an estimated or expected time between when never scrubbed data is quiesced on a data storage media device and when the never scrubbed data is erasure coded. The maximum already scrubbed latency can be selected based on a theoretical minimum scrub latency for data scrubbing all data on the target data storage media device if the target data storage media device were full of data with the addition of a tolerance e where the tolerance e can be selected according to the requirements of the particular implementation at hand such as, for example, a maximum guaranteed scrub latency specified in a service level agreement (SLA).

It should be noted that the first and second threshold can automatically adjust based on the monitored disk activity including based on a quiesced data rate, a data scrubbing rate, a never scrubbed latency, and an already scrubbed latency. For example, if it is detected that a never scrubbed latency is exceeding a maximum never scrubbed latency but an already scrubbed latency is not exceeding a maximum already scrubbed latency, then the first threshold and/or second threshold can be lowered. On the other hand, if it is detected that an already scrubbed latency is exceeding a maximum already scrubbed latency but a never scrubbed latency is not exceeding a maximum never scrubbed latency, then the first threshold and/or the second threshold can be raised.

The amount of the automatic adjustment of the first and second thresholds can be based on a quiesced data rate and a data scrubbing rate. For example, if it is determined to lower the first threshold and/or the second threshold, then the extent to which the threshold(s) are lowered can be based on comparing a quiesced data rate to a data scrubbing rate. If a quiesced data rate is relatively high compared to a data scrubbing rate, then the threshold(s) can be lowered to a greater extent than if a quiesced data rate is not as high compared to a data scrubbing rate.

In some possible implementations, a decision is made to increase a data scrubbing ratio from a first ratio if a never scrubbed latency exceeds a threshold. For example, a data scrubbing ratio may be increased from a first ratio if is detected that a never scrubbed latency of never scrubbed data exceeds a maximum never scrubbed latency.

In some possible implementations, a decision is made to decrease a data scrubbing ratio from a first ratio if the already scrubbed latency exceeds a threshold. For example, a data scrubbing ratio may be decreased from a first ratio if is detected that an already scrubbed latency of already scrubbed data exceeds a maximum already scrubbed latency.

In some possible implementations, a decision is made not to increase or decrease a data scrubbing ratio from a first ratio while the amount of never scrubbed data is below a first threshold, a never scrubbed latency does not exceed a maximum never scrubbed latency, and an already scrubbed latency does not exceed a maximum already scrubbed latency.

In some possible implementations, a decision is made to return a data scrubbing ratio to a default ratio (e.g., equal or approximately equal) when an amount of never scrubbed data falls below a second threshold, a never scrubbed latency falls below a maximum never scrubbed latency, and/or an already scrubbed latency falls below a maximum already scrubbed latency.

Second Data Scrubbing Ratio

At operation 940, if a decision is made 930 to change a data scrubbing ratio from a first ratio to a second ratio, then never scrubbed data and already scrubbed data stored on the target data storage media device is data scrubbed in a second ratio of never scrubbed data to already scrubbed data. The process may then repeat starting with operation 910 with the second ratio becoming the first ratio.

Never Scrubbed Priority Queue for Extents

Figure 10:
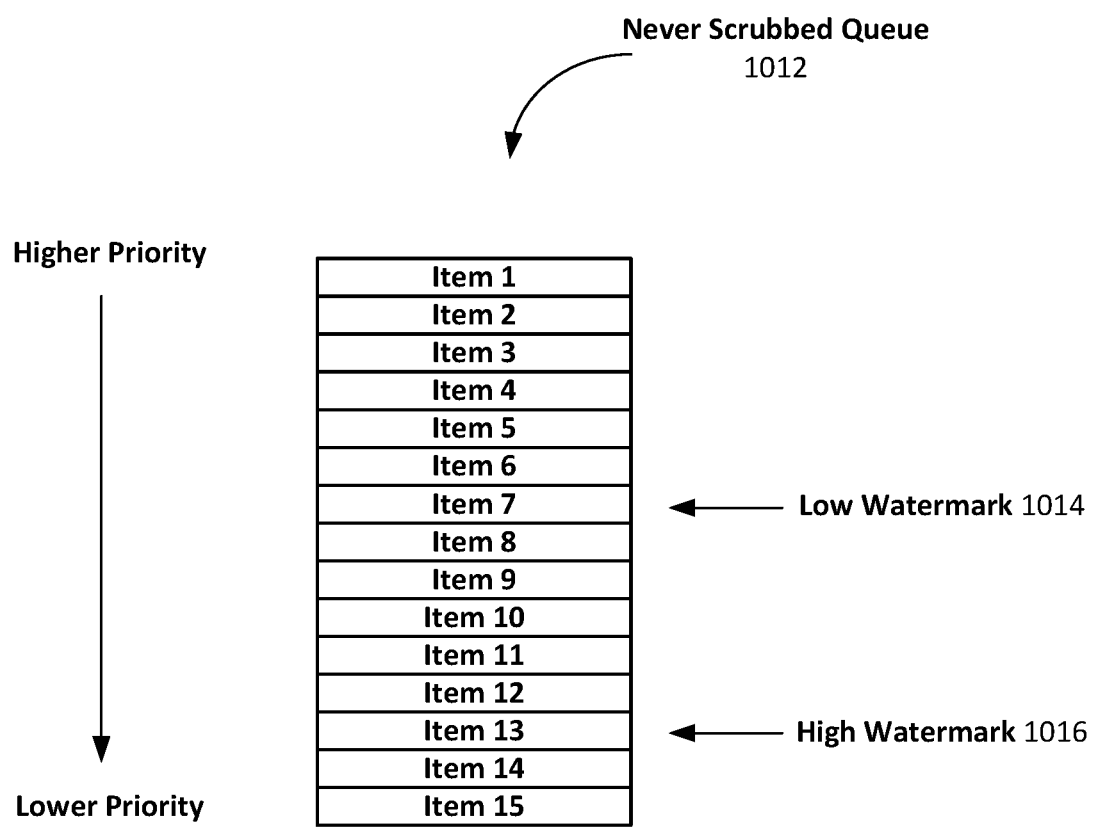
FIG. 10 illustrates a never scrubbed priority queue, according to some possible implementations of the present invention.

FIG. 10 illustrates never scrubbed priority queue 1012 for extents on a target disk, according to some possible implementations of the present invention. When an extent is quiesced on the target disk, a new item is added to never scrubbed priority queue 1012 as the lowest priority item. The new item may be associated with a last quiesced timestamp that indicates when the extent was quiesced on the target disk.

In this example, never scrubbed priority queue 1012 has fifteen (15) queue items corresponding to fifteen (15) never scrubbed extents stored on the target disk with the highest priority queue item (Item 1) representing the never scrubbed extent least recently quiesced on the target disk and the lowest priority queue item (Item 15) representing the never scrubbed extent most recently quiesced on the target disk.

When the highest priority never scrubbed extent is data scrubbed, the corresponding item (e.g., Item 1) may be de-queued from never scrubbed priority queue 1012. In this way, never scrubbed extents are disks scrubbed in priority order from least recently quiesced on a data storage media device to most recently quiesced on a data storage media device.

Never scrubbed priority queue 102 is associated with low watermark 1014 and high watermark 1016. Low watermark 1014 and high watermark 1016 each specify a quantity of items in never scrubbed queue 1012 with low watermark 1014 being a lower quantity than high watermark 1016.

As explained in greater detail below, in some implementations, when the number of items in never scrubbed priority queue 1012 reaches or exceeds high watermark 1016, then never scrubbed extents in never scrubbed queue 1012 can be data scrubbed exclusively until the number of items in never scrubbed priority queue 1012 falls to or below low watermark 1014 after which never scrubbed extents and already scrubbed extents are data scrubbed in an equal or approximately equal ratio. By doing so, never scrubbed extents may be data scrubbed for the first time before they are erasure coded. At the same time, the already scrubbed latency is minimized.

Already Scrubbed Queue for Extents

Figure 11:
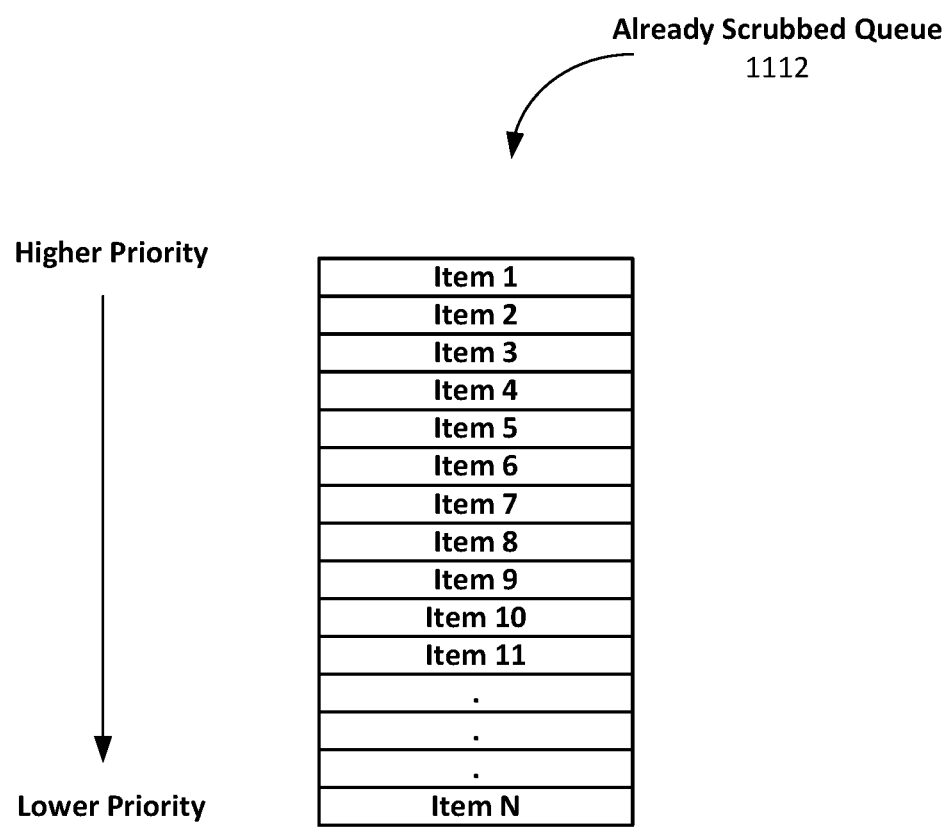
FIG. 11 depicts an already scrubbed priority queue, according to some possible implementations of the present invention.

FIG. 11 depicts already scrubbed priority queue 1112 for extents on a target disk, according to some possible implementations of the present invention. When a never scrubbed extent is data scrubbed for the first time it becomes an already scrubbed extent and a new item is added to already scrubbed priority queue 1112 as the lowest priority item. The new item may be associated with a last scrubbed timestamp that indicates when the extent was data scrubbed for the first time after becoming never scrubbed data on the target disk.

In this example, already scrubbed priority queue 1112 has N number of queue items corresponding to N number of already scrubbed extents stored on the target disk with the highest priority queue item (Item 1) representing the already scrubbed extent least recently scrubbed on the target disk and the lowest priority queue item (Item N) representing the already scrubbed extent most recently scrubbed on the target disk.

When the highest priority already scrubbed extent is data scrubbed, the corresponding item (e.g., Item 1) may be de-queued from already scrubbed priority queue 1112 and re-enqueued as the lowest priority item, associated with an updated last scrubbed timestamp indicating the time the already scrubbed extent was data scrubbed. In this way, already scrubbed extents are data scrubbed in priority order of their associated last scrubbed timestamps from least recently scrubbed to most recently scrubbed.

Adjusting the Data Scrubbing Ratio for Extents

Figure 12:
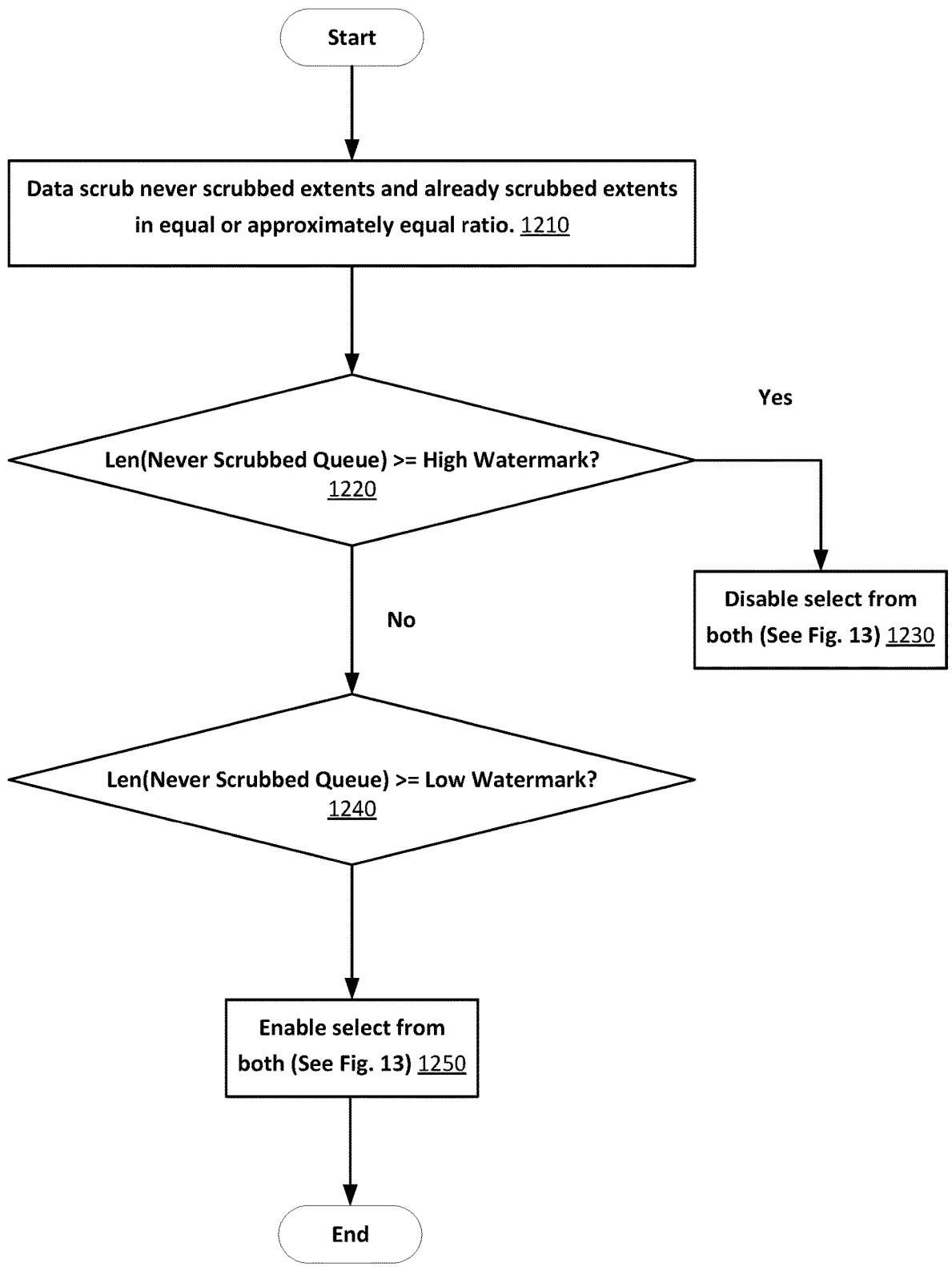
FIG. 12 illustrates a flowchart of a process for adjusting a data scrubbing ratio for extents, according to some possible implementations of the present invention.

FIG. 12 depicts a flowchart of a process for adjusting the data scrubbing ratio for extents stored on a target disk, according to some possible implementations of the present invention.

Initially, at operation 1210, never scrubbed extents and already scrubbed extents are data scrubbed in an equal or approximately equal ratio. For example, the data scrubbing process may alternative between de-queueing the highest priority item from the never scrubbed queue 1012 and the already scrubbed queue 1112 and then data scrub that extent before selecting a next item from the other queue. Alternatively, the data scrubbing process may randomly select the highest priority item from the never scrubbed queue 1012 or the already scrubbed queue 1112 to data scrub next where each queue 1012 and 1112 has an equal or approximately equal probability of being selected.

At operation 1220, if the length (number of items) in never scrubbed queue 1012 is equal to or greater than high watermark 1016, then the algorithm 1210 for data scrubbing never scrubbed extents and already scrubbed extents in an equal or approximately equal ratio is disabled 1230 as described in greater detail below with respect to FIG. 13.

At operation 1240, if the length (number of items) in never scrubbed queue 1012 is equal to or below low watermark 1014, then the algorithm 1210 for data scrubbing never scrubbed extents and already scrubbed extents in an equal or approximately equal ratio remains enabled or is enabled 1250 as described in greater detail below with respect to FIG. 13.

Figure 13:
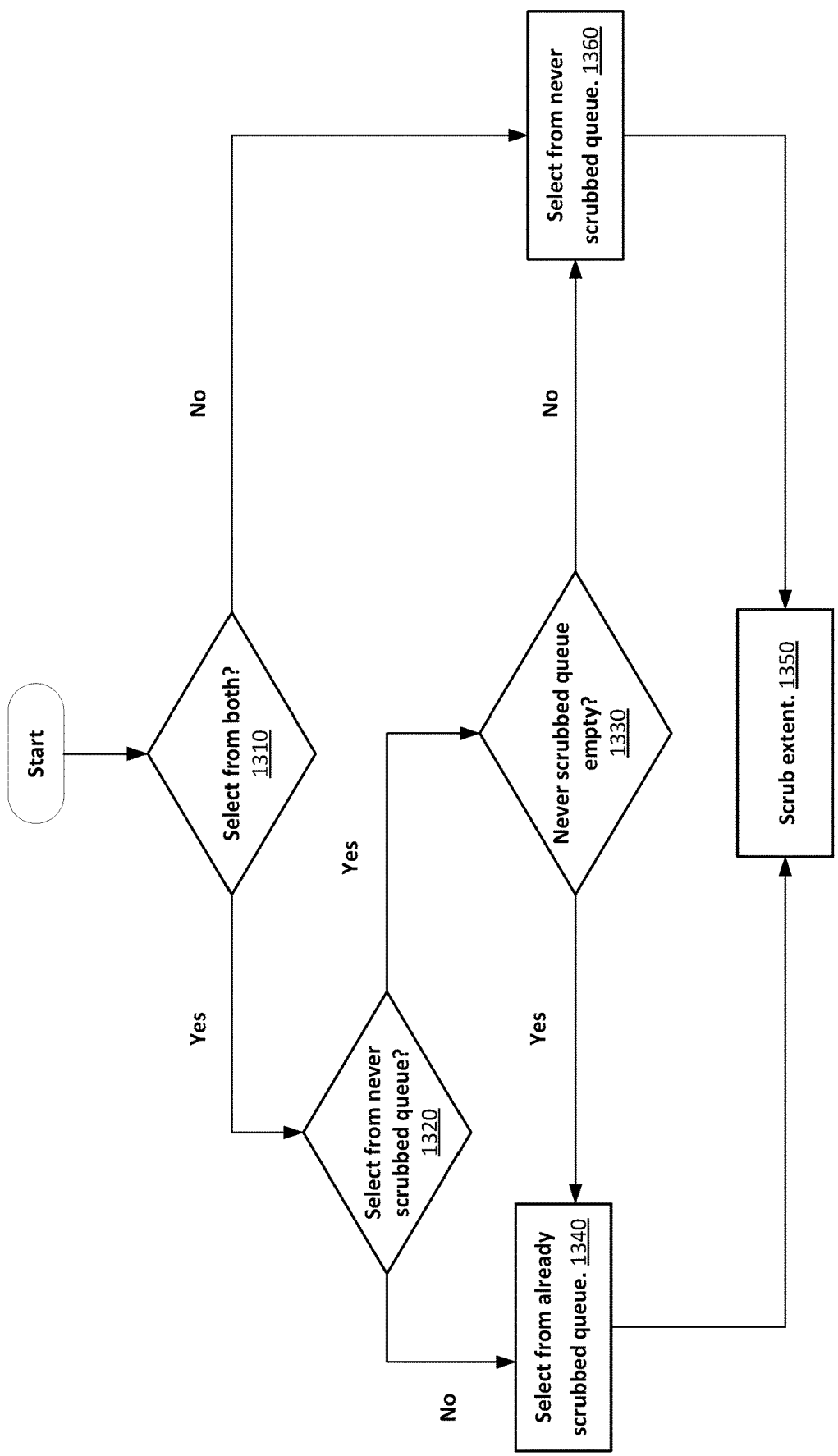
FIG. 13 depicts a flowchart of a process for data scrubbing extents, according to some possible implementations of the present invention.

FIG. 13 illustrates a flowchart of a process for data scrubbing extents stored on a target disk, according to some possible implementations of the present invention. Recall at operation 1230 of FIG. 12, the algorithm 1210 for selecting items from both never scrubbed queue 1012 and already scrubbed queue 1112 can be disable. Also recall that at operation 1250 of FIG. 12, the algorithm 1210 for selecting items from both queues 1012 and 1112 can remain enabled or can become enabled. In this context, the process of FIG. 13 starts.

At operation 1310, if the algorithm 1210 for selecting items from both queues 1012 and 1112 remains enabled or enabled at operation 1250 of FIG. 12, then, at operation 1320, a determination is made to select the highest priority item from never scrubbed queue 1012 or already scrubbed queue 1112 in accordance with algorithm 1210.

If, at operation 1320, it is determined to select the highest priority item from never scrubbed queue 1012, then, at operation 1330, is it determined if never scrubbed queue 1012 is empty. Never scrubbed queue 1012 may be empty if no extents have recently been quiesced on a data storage media device.

If, at operation 1330, never scrubbed queue 1012 is empty, then the highest priority item is selected 1340 from already scrubbed queue 1112. Then, the already scrubbed extent represented by the highest priority item in already scrubbed queue 1112 is data scrubbed 1350. After the already scrubbed extent is data scrubbed 1350, then an item for the already scrubbed extent can be added to already scrubbed queue 1112 as the lowest priority item in already scrubbed queue 1112 and associated with an updated last scrubbed timestamp indicating when the already scrubbed extent was data scrubbed 1350.

If, at operation 1330, never scrubbed queue 1012 is not empty, then the highest priority item is selected 1360 from never scrubbed queue 1012. Then, the never scrubbed extent represented by the highest priority item in never scrubbed queue 1012 is data scrubbed 1350. After the never scrubbed extent is data scrubbed 1350, then an item for the former never scrubbed extent, now already scrubbed extent, can be added to already scrubbed queue 1112 as the lowest priority item in already scrubbed queue 1112 and associated with an updated last scrubbed timestamp indicating when the never scrubbed extent was data scrubbed 1350 for the first time.

If, at operation 1320, it is determined according to algorithm 1210 not to select from never scrubbed queue 1012, then the highest priority item from already scrubbed queue 1112 is selected 1340. Then, the already scrubbed extent represented by the highest priority item in already scrubbed queue 1112 is data scrubbed 1350. After the already scrubbed extent is data scrubbed 1350, then an item for the already scrubbed extent can be added to already scrubbed queue 1112 as the lowest priority item in already scrubbed queue 1112 and associated with an updated last scrubbed timestamp indicating when the already scrubbed extent was data scrubbed 1350.

If, at operation 1310, if the algorithm 1210 for selecting items from both queues 1012 and 1112 is disabled at operation 1230 of FIG. 12, then the highest priority item is selected 1360 from never scrubbed queue 1012. Then, the never scrubbed extent represented by the highest priority item in never scrubbed queue 1012 is data scrubbed 1350. After the never scrubbed extent is data scrubbed 1350, then an item for the former never scrubbed extent, now already scrubbed extent, can be added to already scrubbed queue 1112 as the lowest priority item in already scrubbed queue 1112 and associated with an updated last scrubbed timestamp indicating when the never scrubbed extent was data scrubbed 1350 for the first time.

The processes of FIG. 12, and FIG. 13 can be perform continuously to select and data scrub extents stored on the target disk one at a time to effectively balance a desire to verify never scrubbed extents recently quiesced on a data storage media device data soon after they are quiesced on a data storage media device and before they are erasure coded, when the computing and networking cost of reconstructing the extent in the event of a detected disk error can be lower, against a desire to minimize the latency between rescrubbing already scrubbed extents or to meet a maximum guaranteed already scrubbed latency.

Extensions and Alternatives

In some possible implementations, when already scrubbed data is data scrubbed and a hard disk error is detected with the already scrubbed data, then the already scrubbed data is repaired. In this case, the repaired data may still be considered already scrubbed data or it may be considered never scrubbed data. For example, if the repair requires the repaired data to be erasure coded again, then the repaired data may be considered never scrubbed data.

In some possible implementations, when never scrubbed data is data scrubbed and a hard disk error is detected with the never scrubbed data, then the never scrubbed data is repaired. In this case, the repaired data may now be considered already scrubbed data or it may again be considered never scrubbed data. For example, if the repair requires the repaired data to be restored from semantic mirrors, then the repaired data may again be considered never scrubbed data.

In some possible implementations, after already scrubbed data is rescrubbed, since the already scrubbed data was just recently rescrubbed, an item is added to the already scrubbed queue for the already scrubbed data with the lowest priority among all items in the already scrubbed queue. This is done so that already scrubbed data with older last scrubbed timestamps is rescrubbed before the already scrubbed data that was just rescrubbed is rescrubbed again. However, in some possible implementations, the item is added to the already scrubbed queue such that it does not have the lowest priority. For example, if a hard disk error is detected with the already scrubbed data or if the already scrubbed data is stored on an area of the hard disk known to have hard disk errors, then the item can be added to the already scrubbed queue such that it does not have the lowest priority and is rescrubbed more frequently than other already scrubbed data on the target disk.

Computing System Implementation

Some possible implementations of the present invention may encompass performance of a method by a computing system having one or more processors and storage media. The one or more processors and the storage media can be provided by one or more computer systems. The storage media of the computing system can store one or more computer programs. The one or more programs can include instructions configured to perform the method. The instructions may be executed by the one or more processors to perform the method.

Some possible implementations of the present invention can encompass one or more non-transitory computer-readable media. The one or more non-transitory computer-readable media may store the one or more computer programs that include the instructions configured to perform the method.

Some possible implementations of the present invention can encompass the computing system having the one or more processors and the storage media storing the one or more computer programs that include the instructions configured to perform the method.

Some possible implementations of the present invention can encompass one or more virtual machines that logically operate on top of one or more computer systems and emulate hardware. A virtual machine can be a Type-1 or Type-2 hypervisor, for example. Operating system virtualization using containers is also possible instead of, or in conjunction with, hardware virtualization using hypervisors.

In some possible implementations that encompasses multiple computer systems, the computer systems may be arranged in a distributed, parallel, clustered or other suitable multi-node computing configuration in which computer systems are continuously, periodically, or intermittently interconnected by one or more data communications networks (e.g., one or more internet protocol (IP) networks.) Further, it need not be the case that the set of computer systems that execute the instructions be the same set of computer systems that provide the storage media storing the one or more computer programs, and the sets may only partially overlap or may be mutually exclusive. For example, one set of computer systems may store the one or more computer programs from which another, different set of computer systems downloads the one or more computer programs and executes the instructions thereof.

Example Computer System

Figure 14:
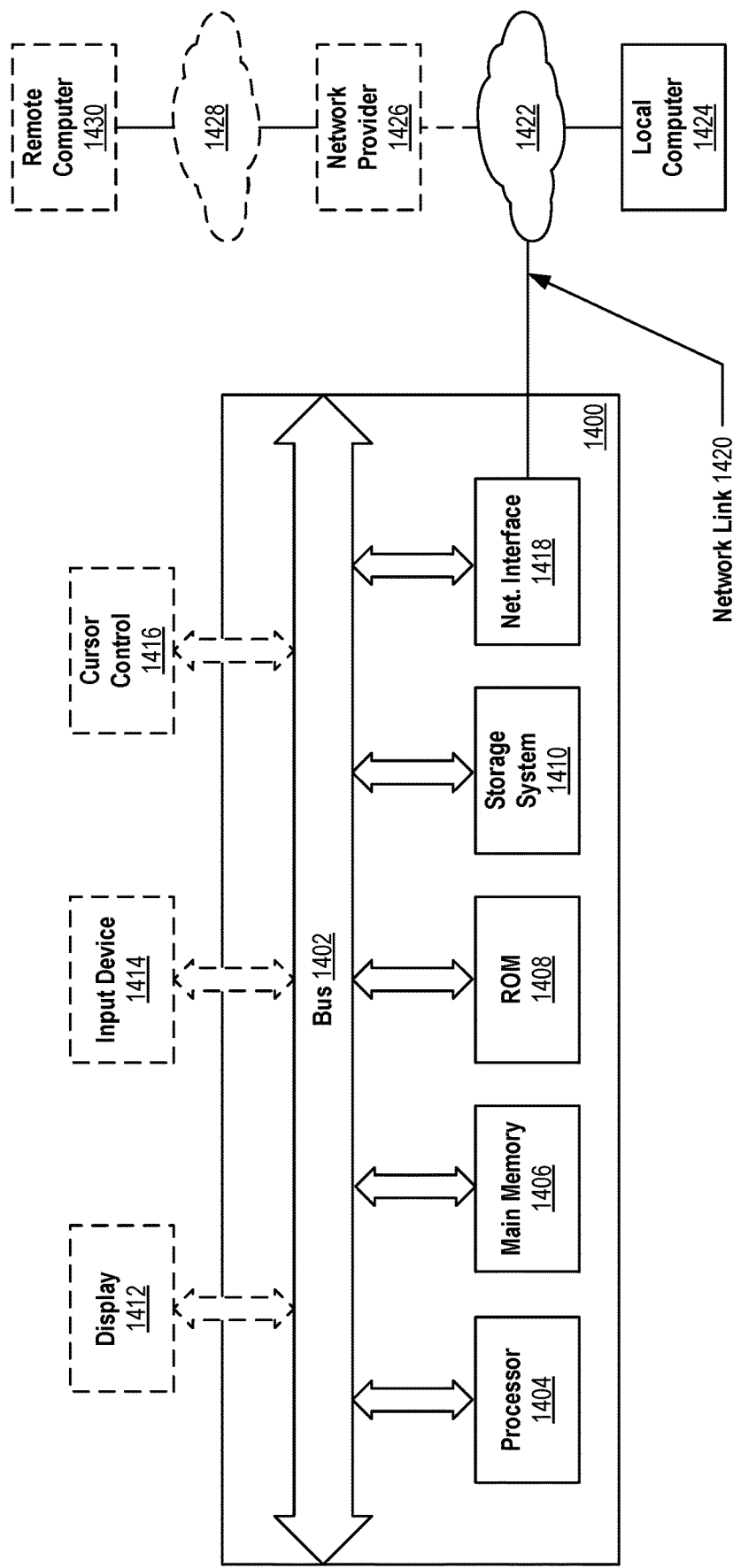
FIG. 14 illustrates a computer system that may be used in an implementation, according to some possible implementations of the present invention.

FIG. 14 is a block diagram of example computer system 1400 used in some possible implementations of the present invention. Computer system 1400 includes bus 1402 or other communication mechanism for communicating information, and one or more hardware processors 1404 coupled with bus 1402 for processing information.

Hardware processor 1404 may include, for example, one or more general-purpose microprocessors, central processing units (CPUs) or cores thereof, graphics processing units (GPUs), or systems on a chip (SoCs).

Computer system 1400 also includes a main memory 1406, typically implemented by one or more volatile memory devices, coupled to bus 1402 for storing information and instructions to be executed by processor 1404. Main memory 1406 also may be used for storing temporary variables or other intermediate information during execution of instructions by processor 1404.

Computer system 1400 may also include read-only memory (ROM) 1408 or other static storage device coupled to bus 1402 for storing static information and instructions for processor 1404.

A storage system 1410, typically implemented by one or more non-volatile memory devices, is provided and coupled to bus 1402 for storing information and instructions.

Computer system 1400 may be coupled via bus 1402 to display 1412, such as a liquid crystal display (LCD), a light emitting diode (LED) display, or a cathode ray tube (CRT), for displaying information to a computer user. Display 1412 may be combined with a touch sensitive surface to form a touch screen display. The touch sensitive surface may be an input device for communicating information including direction information and command selections to processor 1404 and for controlling cursor movement on display 1412 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 1414, including alphanumeric and other keys, may be coupled to bus 1402 for communicating information and command selections to processor 1404.

Another type of user input device may be cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Instructions, when stored in non-transitory storage media accessible to processor 1404, such as, for example, main memory 1406 or storage system 1410, render computer system 1400 into a special-purpose machine that is customized to perform the operations specified in the instructions. Alternatively, customized hard-wired logic, one or more ASICs or FPGAs, firmware and/or hardware logic which in combination with the computer system causes or programs computer system 1400 to be a special-purpose machine.

A computer-implemented process may be performed by computer system 1400 in response to processor 1404 executing one or more sequences of one or more instructions contained in main memory 1406. Such instructions may be read into main memory 1406 from another storage medium, such as storage system 1410. Execution of the sequences of instructions contained in main memory 1406 causes processor 1404 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 1410) and/or volatile media (e.g., main memory 1406). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 1402. Transmission media can also take the form of acoustic or light waves, such as those generated during radio-wave and infra-red data communications.

Computer system 1400 also includes a network interface 1418 coupled to bus 1402. Network interface 1418 provides a two-way data communication coupling to a wired or wireless network link 1420 that is connected to a local, cellular or mobile network 1422. For example, communication interface 1418 may be IEEE 1402.3 wired "ethernet" card, an IEEE 1402.11 wireless local area network (WLAN) card, an IEEE 1402.15 wireless personal area network (e.g., Bluetooth) card or a cellular network (e.g., GSM, LTE, etc.) card to provide a data communication connection to a compatible wired or wireless network. In a possible implementation of the present invention, communication interface 1418 sends and receives electrical, electromagnetic or optical signals that carry digital data streams representing various types of information.

Network link 1420 typically provides data communication through one or more networks to other data devices. For example, network link 1420 may provide a connection through network 1422 to local computer system 1424 that is also connected to network 1422 or to data communication equipment operated by a network access provider 1426 such as, for example, an internet service provider or a cellular network provider. Network access provider 1426 in turn provides data communication connectivity to another data communications network 1428 (e.g., the internet). Networks 1422 and 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the networks 1422 and 1428, network link 1420 and communication interface 1418. In the internet example, a remote computer system 1430 might transmit a requested code for an application program through network 1428, network 1422 and communication interface 1418. The received code may be executed by processor 1404 as it is received, and/or stored in storage device 1410, or other non-volatile storage for later execution.

CONCLUSION

In the foregoing detailed description, some possible implementations of the present invention have been described with reference to numerous specific details that may vary from implementation to implementation. The detailed description and the figures are, accordingly, to be regarded in an illustrative rather than a restrictive sense.

A reference in the detailed description to a possible implementation of the present invention or some possible implementations is not intended to mean that the implementation(s) is/are exclusive of other implementations of the present invention, unless the context clearly indicates otherwise. Thus, an implementation or implementation(s) of the present invention may be combined with one or more other implementations in a particular combination, unless the context clearly indicates that the implementations are incompatible. Further, some possible implementations of the present invention are described herein and are intended to illustrate the present invention by example(s) and are not intended to limit the present invention to the described implementation(s).

In the foregoing detailed description and in the appended claims, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the present invention. The first user interface and the second user interface are both user interfaces, but they are not the same user interface.

As used in the foregoing detailed description and in the appended claims, the singular forms "a," "an," and "the" are intended to include the plural forms as well, unless the context clearly indicates otherwise. As used in the foregoing detailed description and in the appended claims, the term "and/or" refers to and encompasses any and all possible combinations of one or more of the associated listed items.

As used in the foregoing detailed description in the appended claims, the terms "based on," "according to," "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

For situations in which an implementation of the present invention collects information about users, the users may be provided with an opportunity to opt in/out of programs or features that may collect personal information. In addition, in some possible implementations of the present invention, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized rather than associated with a particular user. For example, the user preferences or user interactions may be generalized based on user demographics.

The invention claimed is:

1. A method for fair data scrubbing, the method comprising:
    data scrubbing never scrubbed data and already scrubbed data stored on at least one target data storage media device at a first ratio of never scrubbed data to already scrubbed data;
    monitoring data storage media device activity of the at least one target data storage media device; and
    based on the monitoring of the data storage media device activity of the at least one target data storage media device, data scrubbing never scrubbed data and already scrubbed data stored on the at least one target data storage media device at a second ratio of never scrubbed data to already scrubbed data, wherein the second ratio is different than the first ratio.

2. The method of claim 1, further comprising:
    based on the monitoring of the data storage media device activity of the at least one target data storage media device, determining that never scrubbed data should be data scrubbed at a greater ratio of never scrubbed data to already scrubbed data;
    based on the determining that never scrubbed data should be data scrubbed at a greater ratio of never scrubbed data to already scrubbed data, data scrubbing never scrubbed data and already scrubbed data stored on the at least one target data storage media device at the second ratio; and
    wherein the second ratio is greater than the first ratio.

3. The method of claim 1, further comprising:
    based on the monitoring the data storage media device activity of the at least one target data storage media device, determining that never scrubbed data should be data scrubbed at a smaller ratio of never scrubbed data to already scrubbed data;
    based on the determining that never scrubbed data should be data scrubbed at a smaller ratio of never scrubbed data to already scrubbed data, data scrubbing never scrubbed data and already scrubbed data stored on the at least one target data storage media device at the second ratio; and
    wherein the second ratio is smaller than the first ratio.

4. The method of claim 1, further comprising:
    based on the monitoring data storage media device activity of the at least one target data storage media device, detecting that an amount of never scrubbed data stored on the at least one target data storage media device exceeds a threshold; and
    based on the detecting that the amount of never scrubbed data stored on the at least one target data storage media device exceeds the threshold, data scrubbing never scrubbed data and already scrubbed data stored on the at least one target data storage media device at the second ratio; and
    wherein the second ratio is greater than the first ratio.

5. The method of claim 1, further comprising:
    based on the monitoring data storage media device activity of the at least one target data storage media device, detecting that an amount of never scrubbed data stored on the at least one target data storage media device is below a threshold; and
    based on the detecting that the amount of never scrubbed data stored on the at least one target data storage media device is below the threshold, data scrubbing never scrubbed data and already scrubbed data stored on the at least one target data storage media device at the second ratio; and
    wherein the second ratio is smaller than the first ratio.

6. The method of claim 1, further comprising:
    based on the monitoring data storage media device activity of the at least one target data storage media device, detecting that a scrub latency for never scrubbed data exceeds a threshold; and
    based on the detecting that the scrub latency for never scrubbed data exceeds the threshold, data scrubbing never scrubbed data and already scrubbed data stored on the at least one target data storage media device at the second ratio; and
    wherein the second ratio is greater than the first ratio.

7. The method of claim 1, further comprising:
    based on the monitoring data storage media device activity of the at least one target data storage media device, detecting that a scrub latency for already scrubbed data exceeds a threshold; and
    based on the detecting that the already scrubbed latency exceeds the threshold, data scrubbing never scrubbed data and already scrubbed data stored on the at least one target data storage media device at the second ratio; and
    wherein the second ratio is smaller than the first ratio.

8. One or more non-transitory computer-readable media storing instructions which, when executed by a computing system comprising at least one target data storage media device and one or more processors, cause the computing system to perform:
    data scrubbing never scrubbed extents and already scrubbed extents stored on the at least one target data storage media device at a first ratio of never scrubbed extents to already scrubbed extents;
    monitoring data storage media device activity of the at least one target data storage media device; and
    based on the monitoring the data storage media device activity of the at least one target data storage media device, data scrubbing never scrubbed extents and already scrubbed extents stored on the at least one target data storage media device at a second ratio of never scrubbed extents to already scrubbed extents, wherein the second ratio is different than the first ratio.

9. The one or more non-transitory computer-readable media of claim 8, wherein the instructions, when executed by the computing system comprising the at least one target data storage media device and the one or more processors, cause the computing system to further perform:
based on detecting a number of items in a never scrubbed queue exceeds a high-watermark threshold, determining that never scrubbed extents should be data scrubbed at a greater ratio of never scrubbed extents to already scrubbed extents;
based on the determining that never scrubbed extents should be data scrubbed at a greater ratio of never scrubbed extents to already scrubbed extents, data scrubbing never scrubbed extents and already scrubbed extents stored on the at least one target data storage media device at the second ratio; and
wherein the second ratio is greater than the first ratio.

10. The one or more non-transitory computer-readable media of claim 8, wherein the instructions, when executed by the computing system comprising the at least one target data storage media device and the one or more processors, cause the computing system to further perform:
based on detecting a number of items in a never scrubbed queue falls below a low-watermark threshold, determining that never scrubbed extents should be data scrubbed at a smaller ratio of never scrubbed extents to already scrubbed extents;
based on the determining that never scrubbed extents should be data scrubbed at a smaller ratio of never scrubbed extents to already scrubbed extents, data scrubbing never scrubbed extents and already scrubbed extents stored on the at least one target data storage media device at the second ratio; and
wherein the second ratio is smaller than the first ratio.

11. The one or more non-transitory computer-readable media of claim 8, wherein the instructions, when executed by the computing system comprising the at least one target data storage media device and the one or more processors, cause the computing system to further perform:
detecting when a particular extent is quiesced on the at least one target data storage media device; and
adding an item to a never scrubbed queue, the item representing the particular extent, the item associated with a timestamp reflecting when the particular extent is quiesced on the at least one target data storage media device.

12. The one or more non-transitory computer-readable media of claim 8, wherein the instructions, when executed by the computing system comprising the at least one target data storage media device and the one or more processors, cause the computing system to further perform:
detecting that a particular extent is re-quiesced on the at least one target data storage media device; and
in response to the detecting the detecting that the particular extent is re-quiesced on the at least one target data storage media device, adding an item to a never scrubbed queue, the item representing the particular extent, the item associated with a timestamp reflecting when the particular extent is re-quiesced on the at least one target data storage media device.

13. The one or more non-transitory computer-readable media of claim 8, wherein the instructions, when executed by the computing system comprising the at least one target data storage media device and the one or more processors, cause the computing system to further perform:

lowering a data scrubbing rate of a data scrubbing process that data scrubs extents stored on the at least one target data storage media device in response to detecting activity directed to the at least one target data storage media device by one or more other processes exceeds a threshold.

14. The one or more non-transitory computer-readable media of claim 13, wherein the activity of the one or more other processes that is detected includes at least one of:
a data read rate of the one or more other processes from the at least one target data storage media device;
a date write rate of the one or more other processes to the at least one target data storage media device; or
a input-output operations rate of the one or more other processes directed to the at least one target data storage media device.

15. A computing system comprising:
at least one target data storage media device storing extents;
one or more processors;
one or more storage media storing instructions configured for execution by the one or more processors, wherein the instructions, when executed by the one or more processors, cause the computing system to perform operations comprising:
data scrubbing never scrubbed extents and already scrubbed extents stored on the at least one target data storage media device at a first ratio;
detecting that a number of items in a never scrubbed queue equals or exceeds a high watermark; and
based on the detecting that a number of items in the never scrubbed queue equals or exceeds the high watermark, only data scrubbing never scrubbed extents stored on the at least one target data storage media device and not data scrubbing already scrubbed extents stored on the at least one target data storage media device until a number of items in the never scrubbed queue equals or falls below a low watermark.

16. The computing system of claim 15, the operations further comprising:
detecting that a number of items in the never scrubbed queue equals or falls below the low watermark; and
based on the detecting that a number of items in the never scrubbed queue equals or falls below the low watermark, data scrubbing never scrubbed extents and already scrubbed extents stored on the at least one target data storage media device at an equal or approximately equal ratio.

17. The computing system of claim 15, the operations further comprising:
detecting that a never scrubbed extent is quiesced on the at least one target data storage media device; and
based on the detecting that the never scrubbed extent is quiesced on the at least one target data storage media device, adding an item to the never scrubbed queue, the item added associated with a timestamp indicated when the never scrubbed extent is quiesced on the at least one target data storage media device.

18. The computing system of claim 15, the operations further comprising:
de-queuing an item from an already scrubbed queue;
based on the de-queuing of the item from the already scrubbed queue, data scrubbing an already scrubbed extent corresponding to the de-queued item; and
based on the data scrubbing the already scrubbed extent corresponding to the de-queued item, adding an item to the already scrubbed queue, the added item associated with a timestamp indicated when the already scrubbed extent is last data scrubbed.

19. The computing system of claim 15, the operations further comprising:
alternating selecting a highest priority item from the never scrubbed queue and an already scrubbed queue; and
wherein the data scrubbing never scrubbed extents and already scrubbed extents stored on the at least one target data storage media device in an equal or approximately equal ratio is based on the alternating selecting the highest priority item from the never scrubbed queue and an already scrubbed queue.

20. The computing system of claim 15, the operations further comprising:
randomly selecting a highest priority item from the never scrubbed queue or an already scrubbed queue; and
wherein the data scrubbing never scrubbed extents and already scrubbed extents stored on the at least one target data storage media device in an equal or approximately equal ratio is based on the randomly selecting the highest priority item from the never scrubbed queue or an already scrubbed queue.

* * * * *